United States Patent [19]
Corcoran et al.

[11] Patent Number: 5,446,865
[45] Date of Patent: Aug. 29, 1995

[54] PROCESSOR ADAPTED FOR SHARING MEMORY WITH MORE THAN ONE TYPE OF PROCESSOR

[75] Inventors: Gary T. Corcoran, Fanwood; Robert C. Fairfield, Randolph; Akkas T. Sufi, Somerset, all of N.J.

[73] Assignee: AT&T Corp., Murray Hill, N.J.

[21] Appl. No.: 493,018

[22] Filed: Mar. 13, 1990

[51] Int. Cl.[6] ............... G06F 3/00; G06F 5/00
[52] U.S. Cl. ................... 395/500; 395/375; 364/228.1; 364/228.9; 364/229.2; 364/239.3; 364/260.4; 364/261; 364/DIG. 1; 364/939.2; 364/940.2; 364/946.7
[58] Field of Search ............... 395/375, 500, 650, 425, 395/800, 400, 325

[56] References Cited

U.S. PATENT DOCUMENTS

| | | | |
|---|---|---|---|
| 3,631,405 | 12/1971 | Hoff et al. ............ | 395/650 |
| 3,930,232 | 12/1975 | Wallach et al. ........ | 395/500 |
| 3,997,895 | 12/1976 | Cassonnet et al. ...... | 395/325 |
| 4,117,536 | 9/1978 | Bodner ................ | 395/375 |
| 4,240,139 | 12/1980 | Fukuda et al. ......... | 395/400 |
| 4,293,907 | 10/1981 | Huang et al. .......... | 395/375 |
| 4,485,439 | 11/1984 | Rothstein et al. ...... | 364/200 |
| 4,500,933 | 2/1985 | Chan .................. | 360/69 |
| 4,559,614 | 12/1985 | Peek et al. ........... | 395/500 |
| 4,561,051 | 12/1985 | Rodman et al. ......... | 395/425 |
| 4,580,240 | 4/1986 | Watanabe .............. | 364/900 |
| 4,722,048 | 1/1988 | Hirsch et al. ......... | 395/650 |
| 4,899,306 | 2/1990 | Greer ................. | 364/900 |
| 5,027,271 | 6/1991 | Curley et al. ......... | 395/725 |
| 5,101,498 | 3/1992 | Ehlig et al. .......... | 395/800 |
| 5,261,077 | 11/1993 | Duval et al. .......... | 395/500 |

Primary Examiner—Alyssa H. Bowler
Assistant Examiner—Meng-Ai T. An
Attorney, Agent, or Firm—Gordon E. Nelson

[57] ABSTRACT

A processor specially adapted for use as a coprocessor. The processor is implemented as a microprocessor. The adaptations include the following: The microprocessor has a master-slave pin which receives an input which determines whether the microprocessor operates as a bus master or a bus slave. Certain output pins have three-state bus drivers which employ feedback to ensure that a signal on a line being seen by the driver has gone inactive before the driver is turned off. Instructions executed by the microprocessor permit specification of portions of the internal registers as sources and destinations and specification of the size of an ALU operation, permitting easy operation on data ranging from bytes through 24-bit pointers. Instructions are executed in an instruction pipeline and a separate I/O instruction pipeline. Some pipeline stalls are avoided by means of a special MOVE instruction which differs from an ordinary MOVE instruction in that it does not cause pipeline stall when it reads data from a register loaded by a preceding READ instruction. The microprocessor also has an Intel/Motorola pin whose input specifies the type of host processor the coprocessor is working with and further executes I/O instructions which permit the same code to be used with either host processor.

6 Claims, 18 Drawing Sheets

FIG. 1
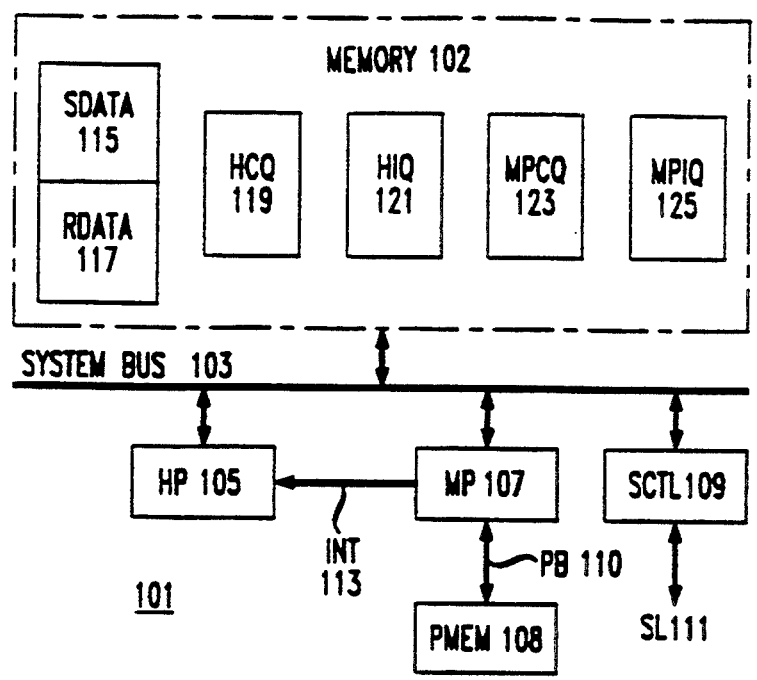
FIG. 3
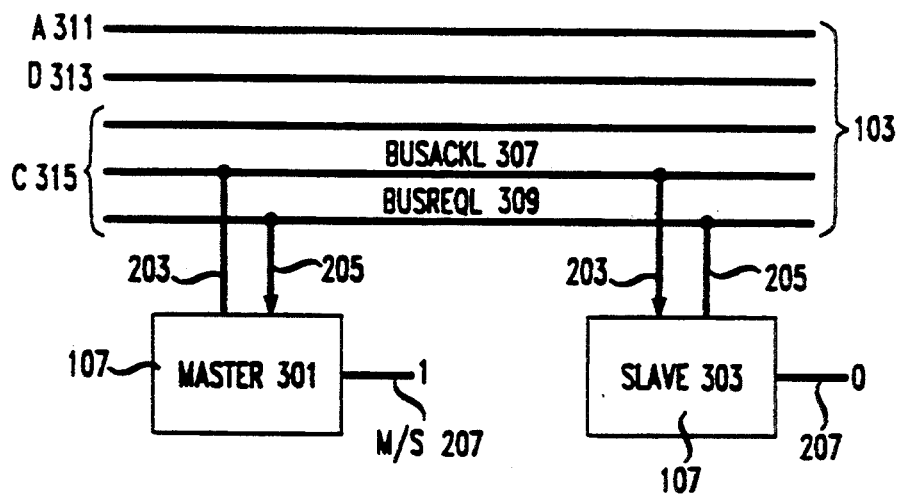
FIG. 12B

FIG. 12A
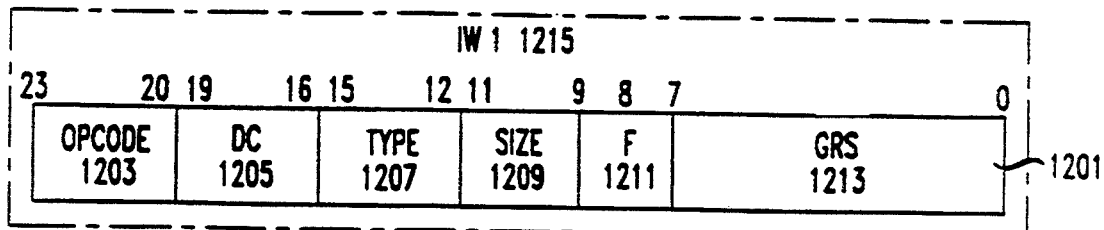
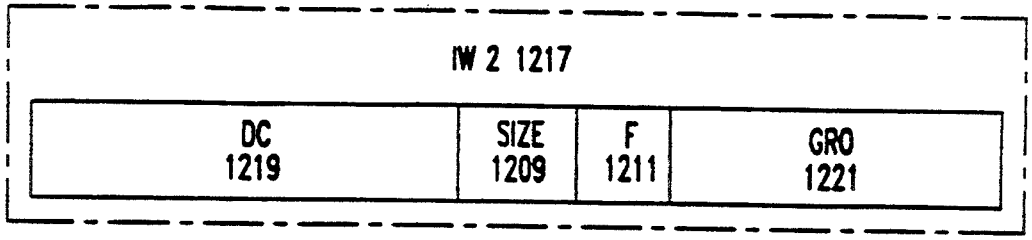
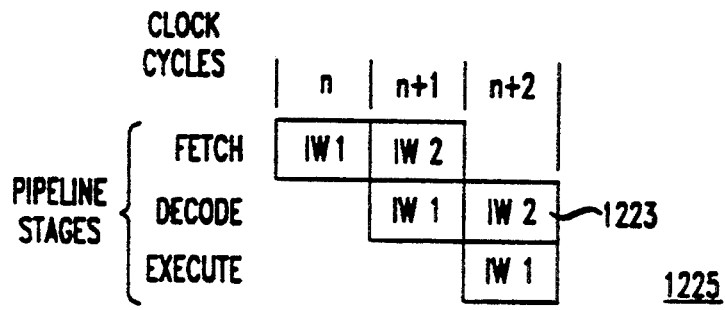
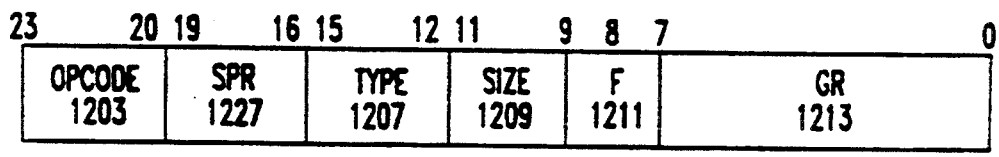
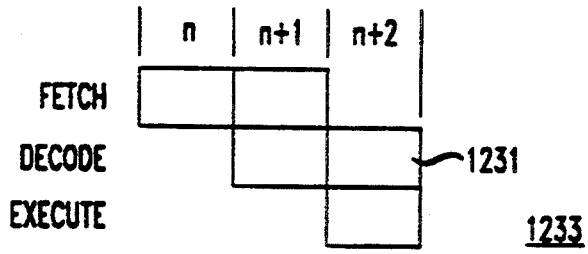
FIG. 15
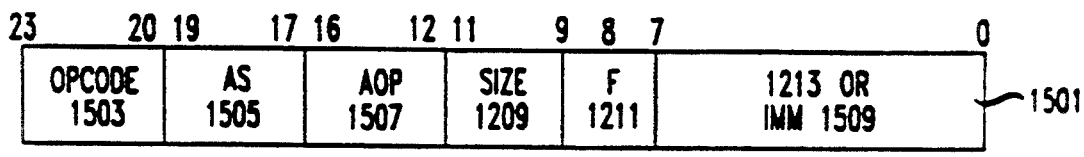

FIG. 13
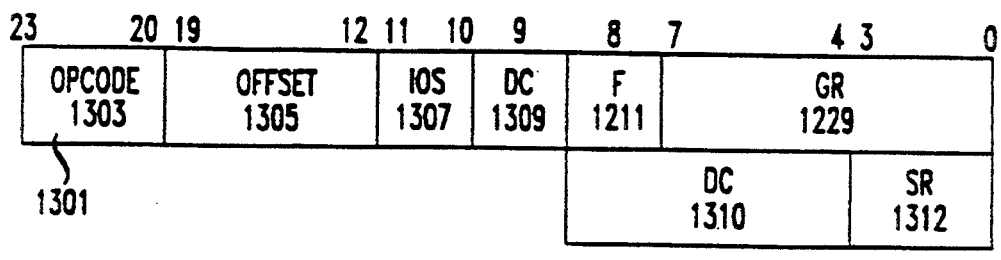
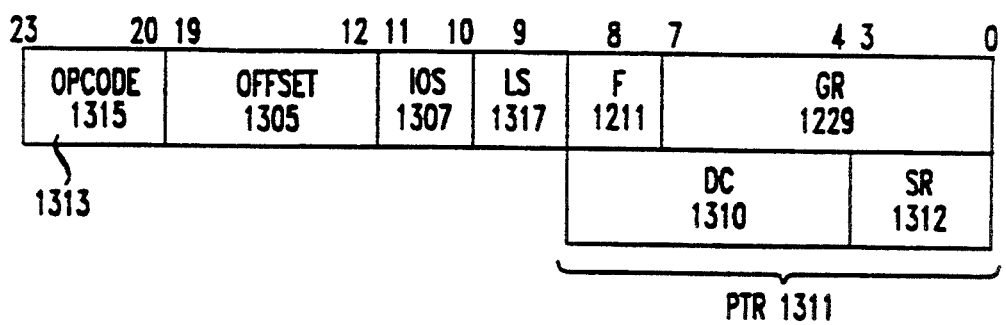
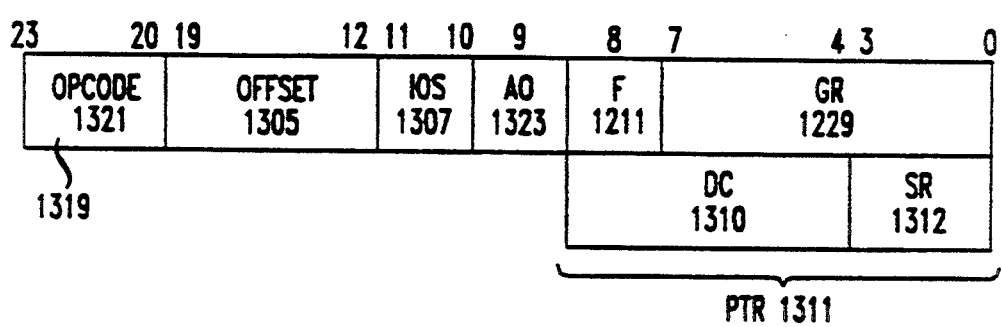
FIG. 17
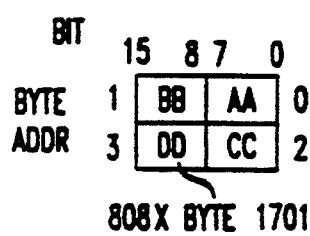
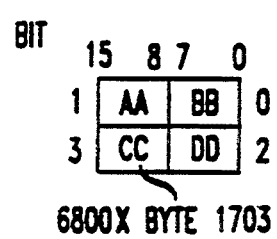
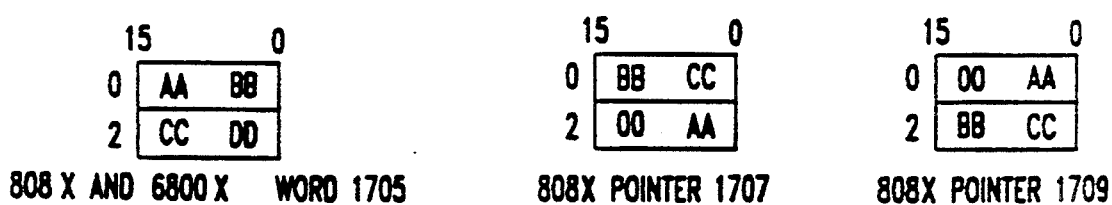

FIG. 14

| | n | n+1 | n+2 | n+3 | n+4 | n+5 | n+6 | n+7 | n+8 |
|---|---|---|---|---|---|---|---|---|---|
| F1903 | $SYSR_1$ | $MIL_1$ | $SYSR_2$ | W1405 | W1405 | $MIL_2$ | $SYSR_3$ | W1405 | W1405 |
| De1905 | | $SYSR_1$ | $MIL_1$ | W1405 | W1405 | $SYSR_2$ | $MIL_2$ | W1405 | W1405 |
| E1907 | | | $SYSR_1$ | W1405 | W1405 | $MIL_1$ | $SYSR_2$ | W1405 | W1405 |

1401 — $SYSR_1$ EIO | $SYSR_2$ EIO

| | n | n+1 | n+2 | n+3 | n+4 | n+5 | n+6 | n+7 | n+8 |
|---|---|---|---|---|---|---|---|---|---|
| F1903 | $SYSR_1$ | $SYSR_2$ | $MILNW_1$ | $SYSR_3$ | W1405 | $MILNW_2$ | $SYSR_4$ | $MILNW_3$ | $SYSR_5$ |
| De1905 | | $SYSR_1$ | $SYSR_2$ | $MILNW_1$ | W1405 | $SYSR_3$ | $MILNW_2$ | $SYSR_4$ | $MILNW_3$ |
| E1907 | | | $SYSR_1$ | $SYSR_2$ | W1405 | $MILNW_1$ | $SYSR_3$ | $MILNW_2$ | $SYSR_4$ |

1403 — $SYSR_1$ EIO | $SYSR_2$ EIO | $SYSR_3$ EIO

FIG. 18

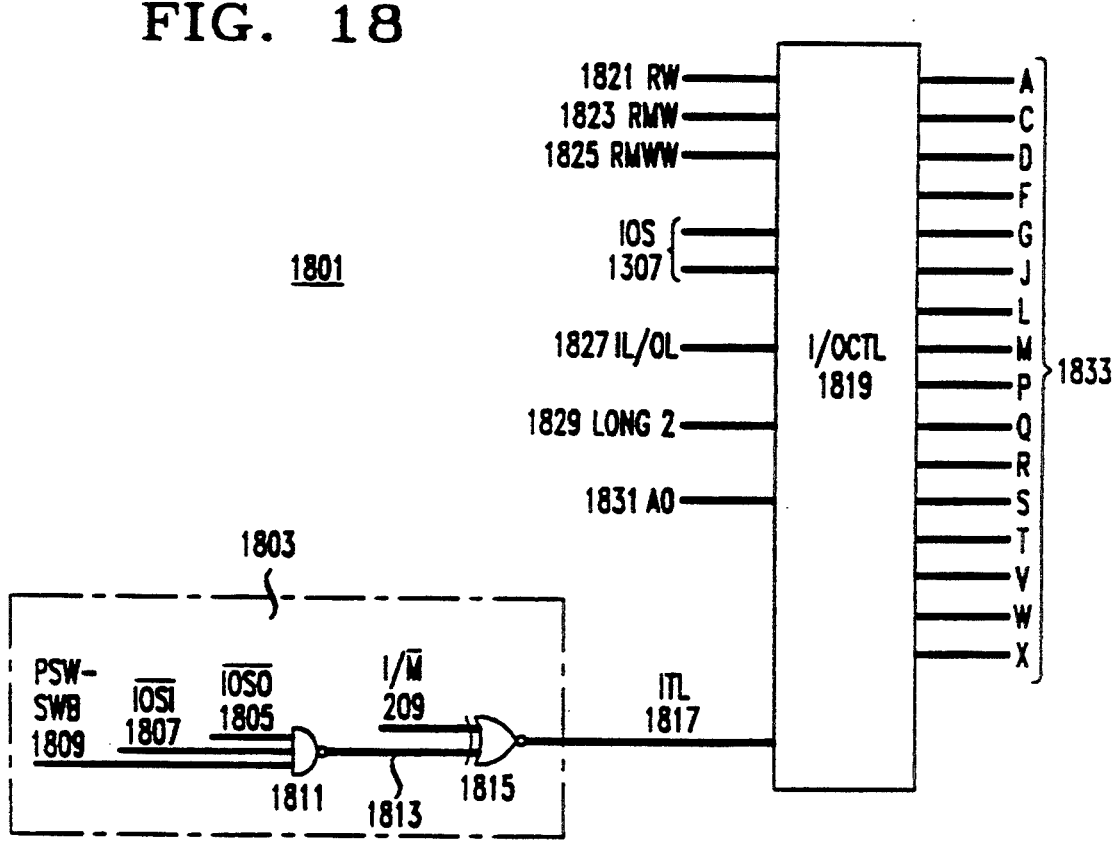

FIG. 22A

SYSTEM MEMORY READS AND READ/MODIFY/WRITES

Notation for IOS 1307:
- BYTE => IOS[1,0] = 00
- WORD => IOS[1,0] = 01
- LONG => IOS[1,0] = 10
- WSB  => IOS[1,0] = 11

Notation for IL/OL:
- 0 => OL
- 1 => IL

| DESCRIPTION | RW | RMW | RMWW | IOS | IL/OL |
|---|---|---|---|---|---|
| Byte Read | 1 | 0 | X | BYTE | X |
|  | 1 | 0 | X | BYTE | X |
|  | 1 | 0 | X | BYTE | X |
|  | 1 | 0 | X | BYTE | X |
| Word Read | 1 | 0 | X | WORD | X |
| WSB Read | 1 | 0 | X | WSB | X |
|  | 1 | 0 | X | WSB | X |
| Pointer Read | 1 | X | X | LONG | X |
|  | 1 | X | X | LONG | X |
|  | 1 | X | X | LONG | X |
|  | 1 | X | X | LONG | X |
| Byte Read Modify Write | 1 | 1 | 0 | BYTE | X |
|  | 1 | 1 | 1 | BYTE | X |
|  | 1 | 1 | 0 | BYTE | X |
|  | 1 | 1 | 1 | BYTE | X |
|  | 1 | 1 | 0 | BYTE | X |
|  | 1 | 1 | 1 | BYTE | X |
|  | 1 | 1 | 0 | BYTE | X |
|  | 1 | 1 | 1 | BYTE | X |
| Word Read Modify Write | 1 | 1 | 0 | WORD | X |
|  | 1 | 1 | 1 | WORD | X |
| WSB Read Modify Write | 1 | 1 | 0 | WSB | X |
|  | 1 | 1 | 1 | WSB | X |
|  | 1 | 1 | 0 | WSB | X |
|  | 1 | 1 | 1 | WSB | X |

FIG. 22B

Notation for IL/OL:_    Meaning of ITL:

0 => OL        0 => Motorola
   1 => IL        1 => Intel

| ITL | LONG2 | A0 | \multicolumn{16}{c}{Selects to be set or cleared: (. => DC)} |
|---|---|---|---|

| ITL | LONG2 | A0 | A | C | D | F | G | J | L | M | P | Q | R | S | T | V | W | X |
|---|---|---|---|---|---|---|---|---|---|---|---|---|---|---|---|---|---|
| 0 | X | 0 | 0 | 0 | 0 | 0 | 0 | 0 | 0 | 1 | . | . | . | . | . | . | . | . |
| 0 | X | 1 | 0 | 0 | 0 | 0 | 0 | 0 | 1 | 0 | . | . | . | . | . | . | . | . |
| 1 | X | 0 | 0 | 0 | 0 | 0 | 0 | 0 | 1 | 0 | . | . | . | . | . | . | . | . |
| 1 | X | 1 | 0 | 0 | 0 | 0 | 0 | 0 | 0 | 1 | . | . | . | . | . | . | . | . |
| X | X | X | 0 | 0 | 0 | 1 | 0 | 0 | 1 | 0 | . | . | . | . | . | . | . | . |
| 0 | X | X | 0 | 0 | 0 | 1 | 0 | 0 | 1 | 0 | . | . | . | . | . | . | . | . |
| 1 | X | X | 0 | 0 | 0 | 0 | 1 | 0 | 0 | 1 | . | . | . | . | . | . | . | . |
| 0 | 0 | X | 0 | 1 | . | . | . | . | . | . | . | . | . | . | . | . | . | . |
| 0 | 1 | X | 1 | 0 | 0 | 1 | 0 | 0 | 1 | 0 | . | . | . | . | . | . | . | . |
| 1 | 0 | X | . | . | 0 | 1 | 0 | 0 | 1 | 0 | . | . | . | . | . | . | . | . |
| 1 | 1 | X | 0 | 1 | 1 | 0 | 0 | 1 | 0 | 0 | . | . | . | . | . | . | . | . |
| 0 | X | 0 | 0 | 0 | 0 | 0 | 0 | 0 | 0 | 1 | . | . | . | . | . | . | . | . |
| 0 | X | 0 | 1 | 0 | 1 | 0 | 0 | 1 | 0 | 0 | 0 | 0 | 1 | 0 | 1 | 0 | 0 | 1 |
| 0 | X | 1 | 0 | 0 | 0 | 0 | 0 | 0 | 1 | 0 | . | . | . | . | . | . | . | . |
| 0 | X | 1 | 1 | 0 | 1 | 0 | 0 | 1 | 0 | 0 | 0 | 0 | 1 | 0 | 1 | 0 | 0 | 1 |
| 1 | X | 0 | 0 | 0 | 0 | 0 | 0 | 0 | 1 | 0 | . | . | . | . | . | . | . | . |
| 1 | X | 0 | 1 | 0 | 1 | 0 | 0 | 1 | 0 | 0 | 0 | 0 | 1 | 0 | 1 | 0 | 0 | 1 |
| 1 | X | 1 | 0 | 0 | 0 | 0 | 0 | 0 | 0 | 1 | . | . | . | . | . | . | . | . |
| 1 | X | 1 | 1 | 0 | 1 | 0 | 0 | 1 | 0 | 0 | 0 | 0 | 1 | 0 | 1 | 0 | 0 | 1 |
| X | X | X | 0 | 0 | 0 | 1 | 0 | 0 | 1 | 0 | . | . | . | . | . | . | . | . |
| X | X | X | 1 | 0 | 1 | 0 | 0 | 1 | 0 | 0 | 0 | 0 | 1 | 1 | 0 | 0 | 0 | 1 |
| 0 | X | X | 0 | 0 | 0 | 1 | 0 | 0 | 1 | 0 | . | . | . | . | . | . | . | . |
| 0 | X | X | 1 | 0 | 1 | 0 | 0 | 1 | 0 | 0 | 0 | 0 | 1 | 1 | 0 | 0 | 0 | 1 |
| 1 | X | X | 0 | 0 | 0 | 0 | 1 | 0 | 0 | 1 | . | . | . | . | . | . | . | . |
| 1 | X | X | 1 | 0 | 1 | 0 | 0 | 1 | 0 | 0 | 0 | 1 | 0 | 0 | 1 | 0 | 0 | 1 |

FIG. 23A

SYSTEM MEMORY WRITES

Notation for IOS 1307
- BYTE => IOS[1,0] = 00
- WORD => IOS[1,0] = 01
- LONG => IOS[1,0] = 10
- WSB  => IOS[1,0] = 11

Notation for IL/OL:
- 0 => OL
- 1 => IL

| DESCRIPTION | RW | RMW | RMWW | IOS | IL/OL |
|---|---|---|---|---|---|
| Byte Write from OL | 0 | X | X | BYTE | 0 |
|  | 0 | X | X | BYTE | 0 |
|  | 0 | X | X | BYTE | 0 |
|  | 0 | X | X | BYTE | 0 |
| Byte Write from IL | 0 | X | X | BYTE | 1 |
|  | 0 | X | X | BYTE | 1 |
|  | 0 | X | X | BYTE | 1 |
|  | 0 | X | X | BYTE | 1 |
| Word Write | 0 | X | X | WORD | 0 |
|  | 0 | X | X | WORD | 1 |
| Pointer Write from OL | 0 | X | X | LONG | 0 |
|  | 0 | X | X | LONG | 0 |
|  | 0 | X | X | LONG | 0 |
|  | 0 | X | X | LONG | 0 |
| Pointer Write from IL | 0 | X | X | LONG | 1 |
|  | 0 | X | X | LONG | 1 |
|  | 0 | X | X | LONG | 1 |
|  | 0 | X | X | LONG | 1 |
| WSB Write | 0 | X | X | WSB | 0 |
|  | 0 | X | X | WSB | 0 |
|  | 0 | X | X | WSB | 1 |
|  | 0 | X | X | WSB | 1 |

FIG. 23B

Meaning of ITL

0 => Motorola
1 => Intel

| ITL | LONG2 | A0 | \multicolumn{14}{c}{Selects to be set or cleared:} |
| --- | --- | --- | --- | --- | --- | --- | --- | --- | --- | --- | --- | --- | --- | --- | --- | --- |
|     |       |    | A | C | D | F | G | J | L | M | P | Q | R | S | T | V | W | X |
| 0 | X | 0 | 1 | 0 | 1 | 0 | 0 | 1 | 0 | 0 | 0 | 0 | 1 | 0 | 1 | 0 | 1 | 0 |
| 0 | X | 1 | 1 | 0 | 1 | 0 | 0 | 1 | 0 | 0 | 0 | 0 | 1 | 0 | 1 | 0 | 1 | 0 |
| 1 | X | 0 | 1 | 0 | 1 | 0 | 0 | 1 | 0 | 0 | 0 | 0 | 1 | 0 | 1 | 0 | 1 | 0 |
| 1 | X | 1 | 1 | 0 | 1 | 0 | 0 | 1 | 0 | 0 | 0 | 0 | 1 | 0 | 1 | 0 | 1 | 0 |
| 0 | X | 0 | 1 | 0 | 1 | 0 | 0 | 1 | 0 | 0 | 0 | 0 | 1 | 0 | 1 | 1 | 0 | 0 |
| 0 | X | 1 | 1 | 0 | 1 | 0 | 0 | 1 | 0 | 0 | 0 | 0 | 1 | 0 | 1 | 1 | 0 | 0 |
| 1 | X | 0 | 1 | 0 | 1 | 0 | 0 | 1 | 0 | 0 | 0 | 0 | 1 | 0 | 1 | 1 | 0 | 0 |
| 1 | X | 1 | 1 | 0 | 1 | 0 | 0 | 1 | 0 | 0 | 0 | 0 | 1 | 0 | 1 | 1 | 0 | 0 |
| X | X | X | 1 | 0 | 1 | 0 | 0 | 1 | 0 | 0 | 0 | 0 | 1 | 1 | 0 | 0 | 1 | 0 |
| X | X | X | 1 | 0 | 1 | 0 | 0 | 1 | 0 | 0 | 0 | 0 | 1 | 1 | 0 | 1 | 0 | 0 |
| 0 | 0 | X | 1 | 0 | 1 | 0 | 0 | 1 | 0 | 0 | 1 | 0 | 0 | 0 | 0 | 0 | 1 | 0 |
| 0 | 1 | X | 1 | 0 | 1 | 0 | 0 | 1 | 0 | 0 | 0 | 0 | 1 | 1 | 0 | 0 | 1 | 0 |
| 1 | 0 | X | 1 | 0 | 1 | 0 | 0 | 1 | 0 | 0 | 0 | 0 | 1 | 1 | 0 | 0 | 1 | 0 |
| 1 | 1 | X | 1 | 0 | 1 | 0 | 0 | 1 | 0 | 0 | 1 | 0 | 0 | 0 | 0 | 0 | 1 | 0 |
| 0 | 0 | X | 1 | 0 | 1 | 0 | 0 | 1 | 0 | 0 | 1 | 0 | 0 | 0 | 0 | 1 | 0 | 0 |
| 0 | 1 | X | 1 | 0 | 1 | 0 | 0 | 1 | 0 | 0 | 0 | 0 | 1 | 1 | 0 | 1 | 0 | 0 |
| 1 | 0 | X | 1 | 0 | 1 | 0 | 0 | 1 | 0 | 0 | 0 | 0 | 1 | 1 | 0 | 1 | 0 | 0 |
| 1 | 1 | X | 1 | 0 | 1 | 0 | 0 | 1 | 0 | 0 | 1 | 0 | 0 | 0 | 0 | 1 | 0 | 0 |
| 0 | X | X | 1 | 0 | 1 | 0 | 0 | 1 | 0 | 0 | 0 | 0 | 1 | 1 | 0 | 0 | 1 | 0 |
| 1 | X | X | 1 | 0 | 1 | 0 | 0 | 1 | 0 | 0 | 0 | 1 | 0 | 0 | 1 | 0 | 1 | 0 |
| 0 | X | X | 1 | 0 | 1 | 0 | 0 | 1 | 0 | 0 | 0 | 0 | 1 | 1 | 0 | 1 | 0 | 0 |
| 1 | X | X | 1 | 0 | 1 | 0 | 0 | 1 | 0 | 0 | 0 | 1 | 0 | 0 | 1 | 1 | 0 | 0 |

PROCESSOR ADAPTED FOR SHARING MEMORY WITH MORE THAN ONE TYPE OF PROCESSOR

CROSS-REFERENCE TO RELATED APPLICATIONS

The following patent applications have substantially the same Detailed Description and Drawings as the present application and were filed on the same date as the present application:

U.S. Ser. No. 7/490,172, U.S. Pat. No. 5,278,959, Gary T. Corcoran, Robert C. Fairfield, *Processor Usable as a Bus Master or a Bus Slave*

U.S. Ser. No. 07/493,012, U.S. Pat. No. 5,321,342, Robert C. Fairfield, Robert R. Spiwak, Akkas T. Sufi, *Three-state Driver with Feedback-controlled Switching*

U.S. Ser. No. 08/044,556, pending Gary T. Corcoran, Robert C. Fairfield, *Processor having General Registers with Separately-Specifiable Subdivisions*

U.S. Ser. No. 08/063,354, U.S. Pat. No. 5,327,537, Gary T. Corcoran, Robert C. Fairfield, *Apparatus for Controlling Instruction Execution in a Pipelined Processor*

TECHNICAL FIELD

The invention relates to digital data processors generally and more specifically to processors employed as coprocessors.

BACKGROUND OF THE INVENTION

1. Field of the Invention

As processors have gotten cheaper, more and more digital data processing systems have appeared in which several processors operate as coprocessors. A coprocessor is a processor which cooperates with another processor to process dam. Classic examples of coprocessors are floating-point units for performing floating point arithmetic and I/O processors for handling the flow of data between peripheral devices such as terminals and the system memory. The relationship between two coprocessors lies along a continuum whose ends are described by the notions tightly coupled and loosely coupled. One coprocessor is tightly coupled to another when there is a high degree of direct interaction between the coprocessors. For example, floating point units are typically tightly coupled. The processor served by the floating point unit provides the operands to the floating point unit, indicates the operation to be performed, and receives the results directly from the floating point unit. The results typically not only include the result value, but also signals indicating the status of the floating point operation. I/O processors, on the other hand, are typically loosely coupled. Communication with the processor they serve is generally through the system memory. When the processor requires the assistance of the I/O processor to output data, the processor places the output data and a description of what the I/O processor is to do with it in memory at a location known to the I/O processor and then indicates to the I/O processor that the data is in memory. The I/O processor thereupon responds to the indication by retrieving the data from memory and outputting it to the desired peripheral device. When it is finished, it puts a record of the status of the operation in memory at a location known to the processor and indicates to the processor that it has finished the memory operation. The processor then responds to the indication by reading the data at the location to determine the status of the output operation.

2. Description of the Prior Art

A problem with memory sharing is that the processors which share the memory must agree on the format of the data which they jointly process. For example, two popular architectures for host processors are the Motorola 680×0 architecture and the Intel 80×86 architecture. These two architectures have different formats for pointers and for the order in which consecutively written bytes are stored in memory. A coprocessor which is to be used with either kind of host must some how deal with these differences. One way of dealing with them in the prior art has been a pin on the coprocessor whose input indicates whether the host is a 680×0 machine or an Intel 80×86 machine. This solution works well as long as the coprocessor reads data in exactly the same way as the host wrote it and vice-versa. The problem with such a solution is that it gives the system designer the choice of slowing the coprocessor down or writing code for the coprocessor which is different for the different kinds of hosts. If the coprocessor reads words as well as bytes and the host has written a sequence of bytes in memory, then the fastest way for the coprocessor to read the bytes is as words; however, if it does so, it will have to process the words differently depending on the host machine, and consequently different code will be necessary for the different host machines. Speed and the cost of writing code are both important considerations for the system designer, and consequently both alternatives are unattractive. It is an object of the apparatus disclosed herein to provide a processor which can both read sequences of bytes as words and employ the same code for both host machines.

SUMMARY OF THE INVENTION

The invention disclosed herein is a processor which can share memory with other processors employing different formats for data stored in the memory. The processor executes instructions including at least one instruction which has data format dependency indicating means. The data format dependency indicating means indicate that the operation is dependent on a data format employed by the other processor with which the processor of the invention is sharing memory. The processor of the invention is characterized by data format signal receiving means for receiving a data format signal indicating the data format and operation means responsive to the data format signal and the data format dependency indicating means for performing the operation specified by the instruction as required by the data format.

BRIEF DESCRIPTION OF THE DRAWINGS

FIG. 1 is a block diagram of a system in which the microprocessor of the present invention is employed;

FIG. 3 is a block diagram of a system in which one microprocessor is employed as a bus master and the other as a bus slave;

FIG. 12A is a diagram showing the format and manner of execution of two types of MOVE instructions for the microprocessor;

FIG. 12B is a diagram showing the format and manner of execution of a third type of MOVE instruction;

FIG. 13 is a diagram showing the format of system memory I/O instructions for the microprocessor;

FIG. 14 is a diagram showing pipelining with and without ILNW;

FIG. 15 is a diagram showing the format of an ALU instruction for the microprocessor.

FIG. 17 is a diagram of data formats employed by certain host processors with which the microprocessor is employed;

FIG. 18 is a logic diagram showing control logic in the I/O subsystem of a preferred embodiment;

FIG. 22A and 22B are the is a truth table for READ and READ-MODIFY-WRITE I/O operations in a preferred embodiment; and FIG. 23A and 23B are the truth table for WRITE I/O operations in a preferred embodiment.

Figure 2A:
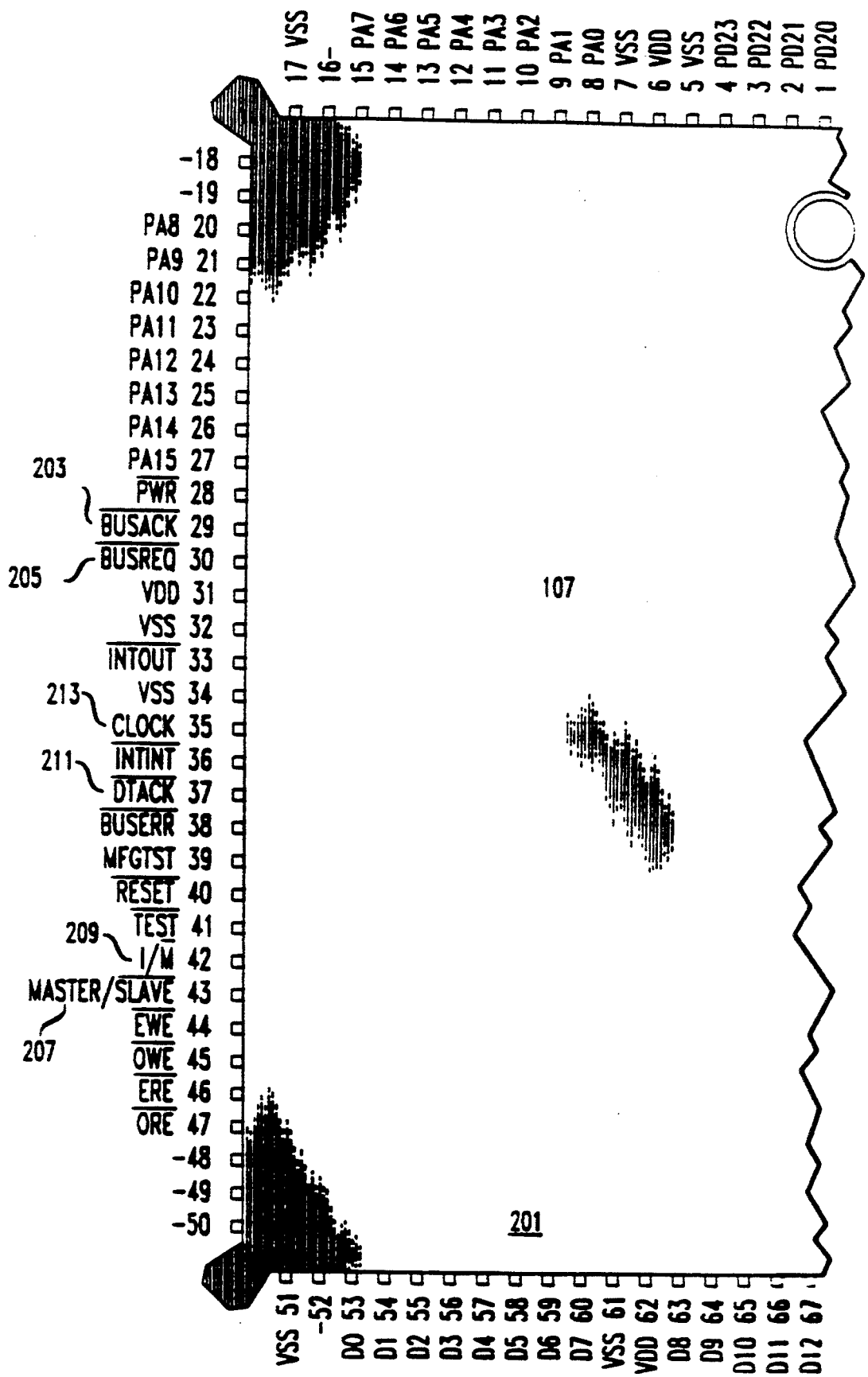
FIG. 2A and 2B is a diagram showing the pinouts of a preferred embodiment of the microprocessor.

Reference numbers used in the following "Detailed Description" have two parts. The rightmost two digits refer to the number of the item being referenced in the first drawing in which it appears; the remaining digits refer to the number of that drawing. Thus, an item with reference number "501" will first appear as item "501" in FIG. 5.

The portion of the Detailed Description beginning with the section titled "I/O Subsection 1135" and FIGS. 11, 13, 17, 18, and 20–23 are particularly relevant to the inventions claimed in the present application.

DETAILED DESCRIPTION

The following Detailed Description of a preferred embodiment of the microprocessor of the present invention will first show how the microprocessor might be used as a coprocessor in a digital data processing system, will then disclose the interface between the microprocessor and such a system, and will continue with discussions of certain aspects of the microprocessor which are of special interest. The aspects are the following:

Using the microprocessor as a bus master or a bus slave;

Forced inactive states on three state outputs before the outputs are turned off;

An instruction which affects the behavior of the microprocessor's instruction pipeline;

Specification of data size in move and ALU instructions; and

Coprocessor-dependent execution of system word read operations and system word write operations.

The aspects will be discussed in the above order.

System Employing the Microprocessor as a Coprocessor: FIG. 1

FIG. 1 shows a system 101 in which the microprocessor of the present invention is employed as a coprocessor. Components of the system include memory 102, system bus 103, host processor 105, microprocessor 107 of the present invention with its private memory (PMEM) 108, and serial controller (SCTL) 109. All of the components are connected by system bus 103, and host processor 105, microprocessor 107, and serial controller 109 all have access to memory 102 via system bus 103. Private memory 108 is connected to microprocessor 107 by private bus (PB) 110. Private memory 108 is accessible only to microprocessor 107. Contents of private memory 108 include programs executed by microprocessor 107 and may also include data used in the execution of those programs. In a preferred embodiment, private memory 108 is a read-write memory and the programs executed by microprocessor 107 are downloaded by microprocessor 107 from memory 102 into private memory 108.

In the system of FIG. 1, microprocessor 107 operates as a coprocessor for dealing with data which is sent or received according to a serial communications protocol. As such, it mediates between host processor 105, which is the source of, or destination for, the data which is sent or received via the protocol, and serial controller 109, which is connected to serial link 111 and which transmits and receives serial protocols over link 111.

Operation of system 101 is as follows: host processor 105 maintains the area SDATA 115 in memory 102 which it uses for data to be sent over SL 111 and RDATA 117 for data which is received over SL 111. When host processor 105 wishes to send data, it places a command to that effect in host command queue (HCQ) 119. The command includes at least a destination address for the data and the location of the data in SDATA 115. Host command queue 119 is at a location in memory 102 which is known to microprocessor 107, and microprocessor 107 periodically polls host command queue 119 to determine whether a new command has arrived. When one has, microprocessor 107 locates the data to be sent in SDATA 115, puts it into the proper form for serial controller 109, and places a pointer to the data and a command into microprocessor command queue (MPCQ) 123. That queue is in a location in memory which is known to serial controller 109, and serial controller 109 periodically polls microprocessor command queue 123. When serial controller 109 finds a command and a pointer in queue 123, it outputs the data at the location specified by the pointer to serial link 111 in the manner specified by the command.

When serial controller 109 receives data on serial link 111, the reverse of the above takes place. Serial controller 109 places the data it has received in RDATA 117 and then places a pointer to the data in microprocessor interrupt queue (MPIQ) 125; microprocessor 107 periodically polls queue 125, and when there is a pointer in queue 125, microprocessor 107 puts the data indicated by the pointer into the proper format for host processor 105. Thereupon, microprocessor 107 places an interrupt message including a pointer to the data in host interrupt queue (HIQ) 121 and provides an interrupt to host processor 105 via interrupt line 113. Host processor 105 responds to the interrupt by examining host interrupt queue 121, and determines from the interrupt message that incoming data has been placed in RDATA 117.

Figure 2B:
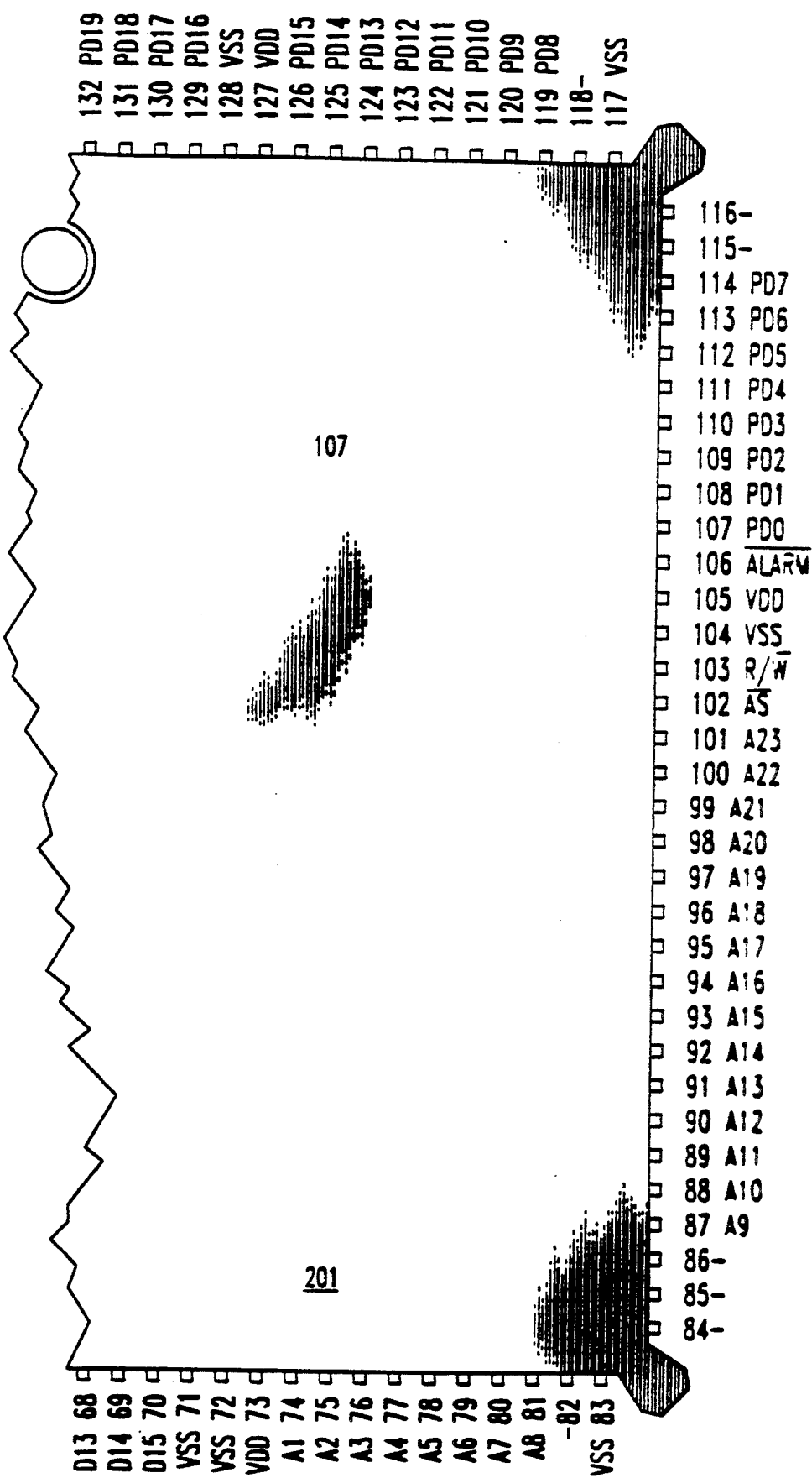

Interface between System 101 and Microprocessor 107: FIG. 2

FIG. 2 is a diagram showing the pins of a preferred embodiment 201 of microprocessor 107 which is implemented as a single integrated circuit in a 132-pin package. Other embodiments may multiplex some pins, and in other embodiments, microprocessor 107 might be a component of a larger integrated circuit; for example, microprocessor 107 and one or more serial controllers 109 might be combined to form a single integrated circuit for handling serial protocols. While microprocessor 107 would have no pins of its own in such an embodiment, it would still send and receive signals substantially equivalent to those sent and received via the pins of preferred embodiment 201.

Certain of the pins of preferred embodiment 201 are of particular interest in the following discussion. They are MASTER/SLAVE pin 207, BUSACK pin 203, BUS REQ pin 205, I/M pin 209, DTACK pin 211, and CLOCK pin 213. The functions of these pins, as well as all of the others, are summarized in the following table:

| 132 Pin Package Pin Descriptions (Fully non-multiplexed interface) | | |
|---|---|---|
| Symbol | Type | Name/Description |
| A23-A1 | O* | Twenty-four bit address bus used to address memory 102. Address line A0 is not explicit because it is not needed in a 16 bit memory; it would only select which byte in a 16 bit word was to be accessed. This information is supplied by the two read enable and two write enable strobes when accessing memory. |
| D15-D0 | I/O* | Sixteen bit data bus used to read and write memory 102. |
| PA15-PA0 | O | Sixteen bit private address bus used to address private memory 108. |
| PD23-PD0 | I/O | Twenty-four bit private data bus used to read and write private memory 108 which usually holds instructions but may also be used to store data when private memory 108 is RAM. |
| AS | O* | Address strobe. Active when microprocessor 107 has placed a valid address on system bus 103. |
| R/W | O* | Read or Write data bus direction indicator. |
| ERE | O* | Even Read Enable data strobe. |
| ORE | O* | Odd Read Enable data strobe. |

| 132 Pin Package Pin Descriptions (Fully non-multiplexed interface) | | |
|---|---|---|
| Symbol | Type | Name/Description |
| EWE | O* | Even Write Enable data strobe. |
| OWE | O* | Odd Write Enable data strobe. |
| DTACK | I | Data Transfer (Read/Write) acknowledge signal. |
| BUSERR | I | System Bus Error input signal. |
| INTIN | I | Interrupt input to microprocessor 107. |
| INTOUT | O | Interrupt output to another processor. |
| PWR | O | Private bus write strobe, active when writing to private memory 108. |
| RESET | I | Master reset, three-states all pins when active. |
| TEST | I | Three-states all pins when driven low. |
| CLOCK | I | Master clock input. |
| MASTER/SLAVE | I | Selects whether microprocessor 107 is a bus master or a bus slave (requester). Microprocessor 107 is a master if this pin is tied to VDD, or a slave if the pin is grounded. |
| I/M | I | System memory format selector. This pin should be grounded to select "Motorola" memory formats, or tied to VDD to select "Intel" memory formats. |
| BUSREQ | I:O | Bus Request. When microprocessor 107 is a bus master, it is an input from another device requesting use of the system bus. When microprocessor 107 is a bus slave, it is used as an output to request use of the system bus. |
| BUSACK | O:I | Bus Acknowledge. When microprocessor 107 is a bus master, it is an output, active when microprocessor 107 has relinquished use of the system bus. When PACER is a bus slave, it is an input, active when use of the system bus has been granted. |
| VDD | Power | +5 volt power supply connections. |
| GND | Power | Ground (power supply return) connections. |

As may be seen from the above table, the preferred embodiment is intended for use in a system 101 in which memory 102 has 16-bit words and is byte addressable; system bus 103 consequently includes 23 address lines, 16 data lines, and control lines. In some embodiments, the control signals BUSACK, BUSREQ, BUSERR, CLOCK, DTACK, RESET, INTIN, INTOUT, EWE, OWE, ERE, ORE, and AS may be part of system bus 103; in others, they may be provided to or received from other logic external to microprocessor 107 which mediates between system 101 and microprocessor 107.

Implementation of the IC of the Preferred Embodiment

The integrated circuit of the preferred embodiment was implemented using CMOS standard cell technology. Much of the control logic for microprocessor 107 was specified as follows: first, a state machine was defined for a given portion of the control logic. The state machine consisted of the states of the portion of the system being controlled by the given portion of the control logic and the transitions between the states. Next, an emulator for the state machine was written in the "C" language. The emulator was tested to confirm the correctness of the state machine. Thereupon, the emulator code was used as an input to a so-called "silicon compiler". The output of the silicon compiler was a specification of circuits in the integrated circuit of the preferred embodiment which implemented the state machine described by the emulator code.

The tools used to implement microprocessor 107 were well within the current state of the art. As can be seen from this fact and the foregoing disclosure of the manner in which control logic in microprocessor 107 was implemented, a description of a state machine is all that is required by one skilled in the art to make and use circuitry which implements the state machine.

Microprocessor 107 as Bus Master and Bus Slave: FIGS. 3–8

As indicated in the "Description of the Prior Art" above, a microprocessor is a bus master when it controls access to a bus and a bus slave when it must request access from a bus master before it can have access to the bus. Microprocessor 107 may be either a bus master or a bus slave, and consequently may be advantageously employed in many different system configurations. FIG. 3 shows a configuration in which one microprocessor 107 is a bus master 301 and another is a bus slave 303. Of course, a microprocessor 107 may be a bus slave in a system in which a device other than another microprocessor 107 is the bus master and a bus master in a system in which devices other than other microprocessors 107 are bus slaves.

Both bus master 301 and bus slave 303 are connected to a bus like bus 103. Included in bus 103 are address lines 311, data lines 313, and control lines 315. Among the control lines are two bus access control lines, BUSREQL line 309 and BUSACKL line 307. BUSREQL line 309 is connected to $\overline{\text{BUSREQ}}$ pin 205 of master 301 and slave 303, while BUSACKL line 307 is connected to $\overline{\text{BUSACK}}$ pin 203 of master 301 and slave 303. As may be seen from the arrows in FIG. 3, $\overline{\text{BUSREQ}}$ pin 205 of slave 303 provides a bus request signal to BUSREQL 309, which in turn provides it to $\overline{\text{BUSREQ}}$ pin 205 of master 301, while $\overline{\text{BUSACK}}$ pin 203 of master 301 provides a bus acknowledgement signal via BUSACKL 307 to $\overline{\text{BUSACK}}$ pin 203 of slave 303. When slave 303 requires access to bus 103, it places the bus request signal on line 309; when bus master 301 determines that slave 303 may have access, bus master 301 responds to the bus request signal with a bus access signal on line 307; when slave 303 receives the bus access signal while it is sending the bus request signal, it knows that it has access to the bus and may send or receive data.

Whether a microprocessor 107 is a bus master, i.e., receives the bus request signal and sends the bus acknowledge signal, or a bus slave, i.e., does the reverse, is determined by the input to M/S pin 207. If the input is a logic 1, microprocessor 107 is a bus master; if it is a logic 0, microprocessor 107 is a bus slave. Generally, microprocessor 107's status as a bus master or bus slave will not change, and consequently, M/S pin 207 is generally tied to VCC in a master 301 and to ground in a slave 303; however, the input to pin 207 could be made switchable and microprocessor 107 could be switched between master status and slave status as required by system 101 to which microprocessor 107 belongs.

More than one microprocessor 107 operating as a slave 303 may be attached to a bus 103; however, in the presently-preferred embodiment, any contention among the slaves 303 for access to the bus must be resolved by priority logic connected between BUSACKL 307 and BUSREQL 309 lines in bus 103 and the corresponding $\overline{\text{BUSACK}}$ 203 and $\overline{\text{BUSREQ}}$ 205 pins of the microprocessors 107 operating as slaves 303. The priority logic would respond to the simultaneous assertion of the bus request signal by more than one slave 303 by determining which of the slaves 303 had priority and generating the bus request signal on BUSREQL line 309 and would respond to the bus acknowledge signal on BUSACKL line 307 by providing the bus acknowledge signal to the slave 303 which had priority. In other embodiments, the priority logic may be incorporated into each microprocessor 107 operating as a slave 303; for example, a slave 303 may receive as well as send the bus request signal and may send the bus request signal only if it is not already receiving it from a slave 303 with higher priority.

Figure 4:
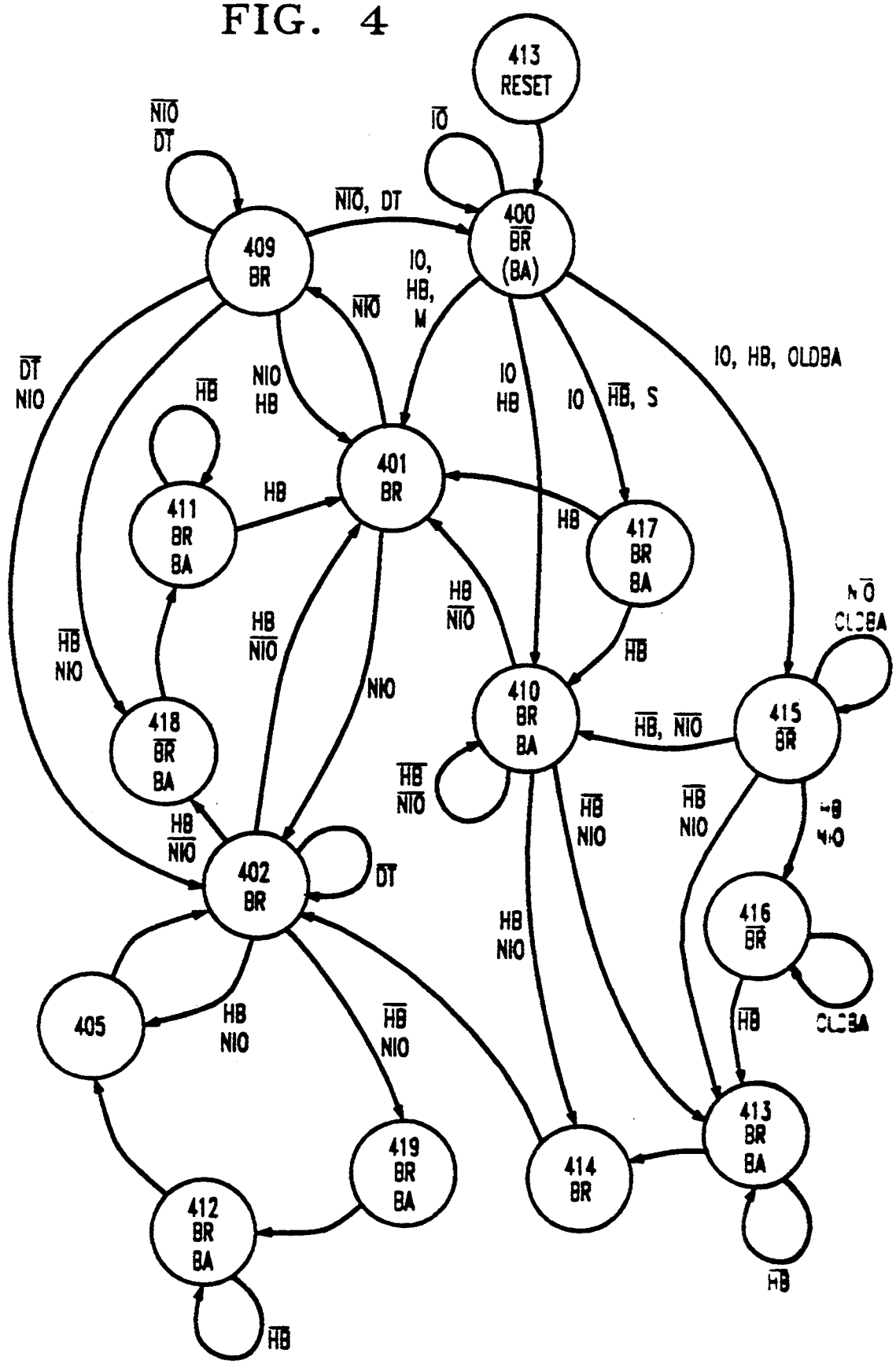
FIG. 4 is a state diagram showing states of the microprocessor which are affected by the master/slave pin.

Implementation of Master-Slave Control Logic: FIG. 4

As previously indicated, the control logic for a preferred embodiment of microprocessor 107 was implemented by providing "C" programs which emulated the states of various subsystems of microprocessor 107 to the silicon compiler used to produce the masks for the microprocessor IC. FIG. 4 is a state diagram for that portion of the I/O subsystem of microprocessor 107 which is relevant to the interaction of I/O operations with inputs from MASTER/SLAVE pin 207, $\overline{\text{BUSACK}}$ pin 203, and $\overline{\text{BUSREQ}}$ pin 205. The following discussion will first present an overview of I/O operations as they are performed by the master and slave, and will then explain the operations in detail using the state diagram of FIG. 4.

As will be explained in more detail later, microprocessor 107 includes a pipeline for executing instructions and a pipeline for performing I/O operations; consequently, more than one I/O operation may be pending at any given time. The I/O instructions executed by microprocessor 107 from the time a given I/O instruction is executed to the time at which there are no more I/O instructions in the instruction pipeline or the I/O pipeline is termed in the following a sequence of I/O instructions. The rules for performing I/O operations are the following:

Master 301

Master 301 may begin executing a sequence of I/O instructions whenever it is not receiving an active bus request signal on $\overline{\text{BUSREQ}}$ pin 205.

If master 301 is executing a sequence of I/O instructions when it receives an active bus request signal, it finishes the I/O instruction for which it is currently performing a memory read or write operation and then provides an active bus acknowledge signal on $\overline{\text{BUSACK}}$ pin 203. The bus acknowledge signal remains active until slave 303 ceases sending the active bus request signal.

If master 301 is not executing a sequence of I/O instructions when it receives the active bus request signal, it immediately provides the active bus acknowledge signal.

Slave 303

Slave 303 may begin executing a sequence of I/O instructions when it is providing an active bus request signal to master 301 and is receiving an active bus acknowledge signal in return.

Slave 303 continues executing the sequence of I/O instructions either until it is done or until master 301 ceases providing the active bus acknowledge signal. In the first case, when slave 303 is finished, it ceases providing the active bus request signal, and master 301 responds thereto by ceasing to provide the active bus acknowledge signal. In the second case, slave 303 responds when the bus acknowledge signal goes inactive by first finishing the I/O instruction for which it is currently performing a memory read or write operation and then ceasing to provide the active bus request signal for one bus cycle. This response permits a master 301 which is not a microprocessor 107 to regain control of bus 103 from a microprocessor 107 operating as a slave 303.

As may be seen from the foregoing, master 301 has access to bus 103 whenever slave 303 is not requesting access and can also force slave 303 to give up bus 103 at any time, but slave 303 has access only when slave 303 is requesting access and master 301 has responded with the $\overline{\text{BUSACK}}$ signal.

FIG. 4 is a standard state diagram. Each circle represents one of the states of the I/O subsystem of microprocessor 107, and the arrows indicate transitions from one state to the next. The legends on the arrows indicate the conditions which bring about the transitions indicated by the arrows, and the legends inside the circles are the names of signals generated by that state. The diagram has been simplified to show only those conditions and signals which are directly relevant to microprocessor 107's roles as bus master 301 and bus slave 303. The conditions of interest are the following:

DT: $\overline{\text{DTACK}}$ signal received on pin 211.
IO: sequence of I/O operations to do.
HB: microprocessor 107 has access to bus 103.
M: microprocessor 107 is a master 301.
NIO: microprocessor 107 has further I/O pending.
S: microprocessor 107 is a slave 303.

Negations of these conditions have the obvious meanings.

The signals of interest are BR, which slave 303 outputs on $\overline{\text{BUSREQ}}$ pin 205, and BA, which master 301 outputs on $\overline{\text{BUSACK}}$ pin 203. Of course, if master is in a state which outputs BR, the signal will not appear on pin 205. The same holds for a slave in a state which outputs BA. On the input side, the results of BR and BA appear in HB and $\overline{\text{HB}}$: If microprocessor 107 is a master 301, HB means either that master 301 is not receiving an active bus request signal or that it is, but is finishing an I/O operation and has not yet provided an active bus acknowledge signal. If microprocessor 107 is a slave 303, HB means that slave 303 is providing an active bus request signal and is receiving an active bus acknowledge signal. The meaning of $\overline{\text{HB}}$ is the negation of HB in each of the above cases, i.e., in the case of master 301, that slave 303 has bus 103, and in the case of slave 303, that master 301 has bus 103.

Continuing with the details of FIG. 4, the starting state is reset 413 which is entered in response to a $\overline{\text{RESET}}$ signal received in a pin of preferred embodiment 201. The next state is always state 400. As long as microprocessor 107 is performing no I/O operations on bus 103, it remains in state 400, as indicated by the arrow labeled $\overline{\text{IO}}$. What happens when microprocessor 107 has an I/O operation to perform depends on whether microprocessor 107 is a master 301 or a slave 303.

I/O Operations by Master 301

If microprocessor 107 is a master 301, it has bus 103 unless slave 303 has it. In the first case, indicated by the arrow labeled IO, HB, M, the next state is state 401, which starts a sequence of I/O operations by putting the signals required for the I/O operation on bus 103. If the sequence consists of only a single I/O operation, there are no pending I/O operations, and as indicated by the arrow labeled $\overline{\text{NIO}}$, the next state is 409, which completes any sequence of I/O operations. As shown by the arrow which loops back into state 409 and the arrow to state 418, master 310 remains in state 409 until one of three things happens: master 301 receives a $\overline{\text{DTACK}}$ signal on pin 211 indicating that memory 102 has either received or provided the data specified in the most recent I/O operation of the sequence, until master 301 has another I/O instruction to execute, so that further I/O is pending, or until master 301 receives a $\overline{\text{BUSREQ}}$ signal and consequently loses bus 103. When $\overline{\text{DTACK}}$ has been received, as indicated by DT, but no further I/O is pending, the next state is state 400. If further I/O is pending before the $\overline{\text{DTACK}}$ signal is received, the next state is 402; if the further I/O comes in at the same time the $\overline{\text{DTACK}}$ signal is received, the next state is 401. If master 301 loses bus 103, the next state is 418, in which master 301 provides the $\overline{\text{BUSACK}}$ signal, and the state following that is state 411, in which master 301 remains until it again has bus 103, as indicated by the looping arrow with $\overline{\text{HB}}$. While master 301 is in state 411, it continues to provide the $\overline{\text{BUSACK}}$ signal, as indicated by the BA. When master 301 again has bus 103, it goes to state 401.

If the sequence consists of more than one I/O operation, as indicated by NIO, the next state after state 401 is state 402, which places the signals for each following I/O operation on bus 103 and waits for the $\overline{\text{DTACK}}$ signal, as indicated by the arrow which loops back. As long as NIO indicates that the sequence of I/O operations is not finished and master 301 has the bus, i.e., has not received a $\overline{\text{BUSREQ}}$ signal, the state which master 301 enters after it receives the $\overline{\text{DTACK}}$ signal is state 405, which simply returns to state 402. When no further I/O is pending, as indicated by NIO, the state which follows state 402 depends on whether master 301 still has the bus or has received a $\overline{\text{BUSREQ}}$ signal. In the first case, the next state is 401, which places the last I/O operation of the sequence on bus 103 and then goes to state 409, as previously indicated. In the second case, the next state is 18, and master 301 proceeds as indicated in the description of that state and state 11 above.

When master 301 receives a $\overline{\text{BUSREQ}}$ signal from slave 303 while master 301 still has I/O pending, that signal takes effect in state 402. Since master 301 has now lost the bus, the next state is 419, in which master 301 supplies the $\overline{\text{BUSACK}}$ signal, permitting slave 303 access to bus 103. The next state is 412, in which master 301 remains as long as slave 303 has bus 103. During that period, master 301 continues to output the $\overline{\text{BUSACK}}$ signal. When slave 303 relinquishes bus 103, master 301 returns to state 405 and the remainder of the sequence is executed as described above.

When master 301 has an I/O instruction pending but slave 303 has bus 103, the state following state 400 is state 410, as indicated by the label IO, $\overline{HB}$ on the arrow. Master 301 remains in state 410 until one of two things occurs: master 301 again has the bus, i.e., slave 303 inactivates its bus request signal, or additional I/O has come in. Beginning with the first situation, if there is only one I/O operation pending when master 301 again has the bus, as indicated by HB, $\overline{NIO}$, the next state is 401, and the I/O operation proceeds as indicated above for a sequence of one I/O operation. If there is already another I/O operation pending, as indicated by HB, NIO, the next state is 414, which places the signals for the first I/O operation of the sequence on bus 103. The next state is state 402, which proceeds with the remaining I/O operations of the sequence as described above. If master 301 still does not have the bus when the next I/O instruction comes in, as indicated by $\overline{HB}$ and NIO, the next state is 413. Master 301 remains in that state until it has the bus, and then goes to state 414, from whence it goes to 402 as described above.

I/O Operations By Slave 303

Before slave 303 can perform I/O operations, it must place the bus request signal on bus 103 and master 301 must respond with a bus acknowledge signal. If slave 303 has not had any I/O to do and has spent several cycles in state 400, this is straightforward enough: when slave 303 has I/O to do, it goes to state 417; in that state, it outputs the bus request signal; if it receives the bus acknowledge signal in that state, it goes to state 401, from which the I/O operation proceeds as described above, except that, as indicated above, master 301 may remove slave 303 from bus 103 by inactivating the bus acknowledge signal. What happens in that case will be explained in detail below. If slave 303 does not receive the bus acknowledge signal in state 417, it goes to 410, where it remains until it has bus 103 or until there is more than one I/O operation in the sequence of I/O operations. When slave 303 gets bus 103, what happens next depends on whether there is more than one I/O operation in the sequence. If there is only one, the next state is 401, and the I/O operation is performed as described above. If there is more than one, the next state is 414, which performs the first I/O operation of the sequence. The following state is 402, from which the rest of the sequence is dealt with as described above. If slave 303 has more than one I/O operation in the sequence before it receives bus 103, the state following state 410 is state 413. Slave 103 remains in that state until it gains access to bus 103; when it gains access, it goes to state 414 and proceeds as indicated above. In all cases, when slave 303 reaches state 400, it inactivates the bus request signal.

When master 301 inactivates the bus acknowledge signal to remove slave 303 from bus 103, the inactivation takes effect when either state 409 or state 402 is reached following the inactivation. When the inactivation takes effect in state 409, the next state is state 400 if there is no further I/O. If there is further I/O pending, the next state is 418, followed by state 411. Slave 303 remains in state 411 until it again has bus 103 and then proceeds to state 401 to begin completing the pending of I/O operations. When the inactivation takes effect in state 402, if there is no pending I/O, the next state is 418, followed by state 411. From there, slave 303 proceeds as indicated above. If there is pending I/O when the inactivation takes effect in state 402, the next state is 419, followed by 412. Slave 303 remains in state 412 until it again receives access to bus 103; at that point, it returns to state 405 and the pending I/O is finished as already explained.

The only other case remaining to be considered is when slave 303 enters state 400 from state 409, inactivates the bus request signal, and again has I/O to do before it leaves state 400. In this situation, slave 303 cannot simply immediately reactivate the bus request signal, but instead must wait until master 301 has inactivated the bus acknowledge signal. To accomplish this, slave 303 goes to state 415, where it remains either until master 301 deactivates the bus acknowledge signal or until there is more than one I/O operation in the sequence.

If deactivation occurs with only one I/O operation in the sequence, slave 303 goes to state 410, where it activates the bus request signal. Slave 303 remains in state 410 until it either receives the active bus acknowledge signal from master 301 or there is more than one I/O operation in the sequence. If the first event occurs before the other, slave 303 goes to state 401 and does I/O from that state as described above; if the second occurs before the first, slave 303 goes to state 413 and waits there until it has the bus, whereupon it enters state 414 and does I/O starting from that state as described above; if both events happen in the same cycle, slave 303 goes directly to state 414.

If deactivation occurs in the same cycle of slave 303 in which the sequence gets more than one I/O operation, the next state is 413; slave 303 activates the bus request signal in that state and waits in the state until it receives the bus acknowledge signal; it then proceeds to state 414 to begin I/O as described above. If the sequence gets more than one I/O operation before the bus acknowledge signal is deactivated, the next state is 416, where slave 303 waits until the bus acknowledge signal is deactivated. When this happens, slave 303 goes to state 413, where it activates the bus request signal and waits for the bus as just described.

Figure 5:
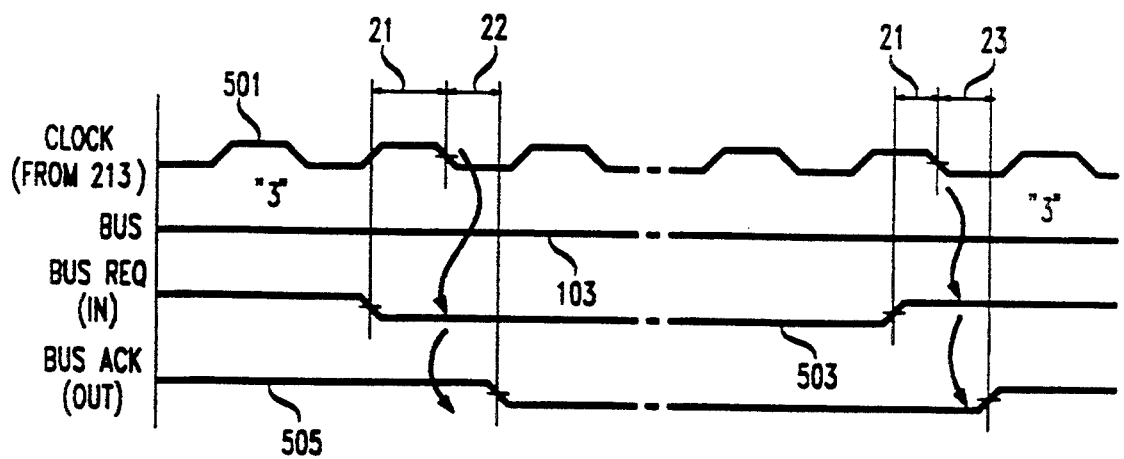
FIG. 5 is a timing diagram showing bus req/ack timing in a microprocessor in master mode with no I/O in progress.
Figure 6:
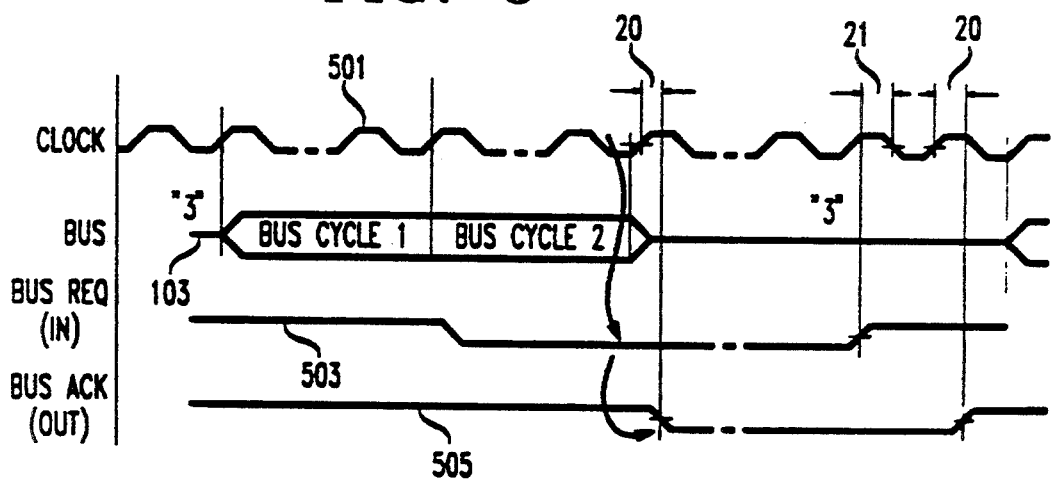
FIG. 6 is a timing diagram showing bus req/ack timing in a microprocessor in master mode with I/O in progress and pending.
Figure 7:
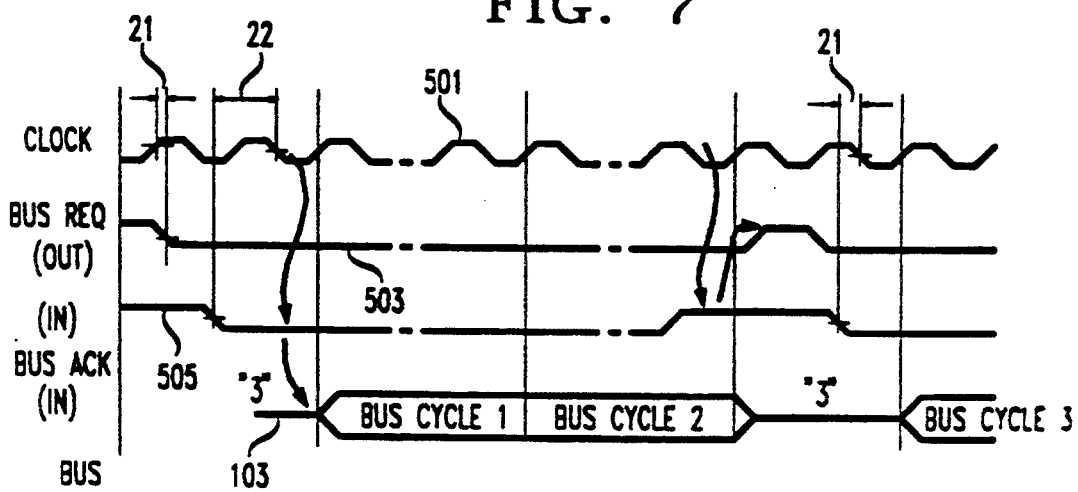
FIG. 7 is a timing diagram showing bus req/ack timing in a microprocessor in slave mode.

Timing Diagrams for the Bus Request and Bus Acknowledge Signals: FIGS. 5–7

FIGS. 5 through 7 are timing diagrams showing the timing of the bus request and bus acknowledge signals. FIG. 5 shows the timing of the signals when a master 301 is not itself doing I/O and receives a bus request signal from a slave 303. Events in the timing diagram are regulated by CLOCK signal 501, which is provided from bus 103 on CLOCK pin 213. In preferred embodiment 201, the maximum frequency of CLOCK is 20 MHz. Bus 103 represents all of the signals on bus 103 except the other signals shown in FIG. 5. The bus request signal appears as $\overline{BUSREQ}$ 503 and the bus acknowledge signal appears as $\overline{BUSACK}$ 505. Both signals are active low in the preferred embodiment. As shown in FIG. 5, when master 301 is not doing I/O and slave 303 activates $\overline{BUSREQ}$ 503, master 301 responds by activating $\overline{BUSACK}$ 505; when slave 303 is finished with its I/O and deactivates $\overline{BUSREQ}$ 503, master 301 responds by deactivating $\overline{BUSACK}$ 505. In preferred embodiment 201, the period indicated by 21 is the set up time required by master 301 to recognize a change in $\overline{BUSREQ}$ 503, the period indicated by 22 is the time required to activate $\overline{BUSACK}$ 505 thereafter, and 23 is the time to deactivate $\overline{\text{BUSACK}}$ 505. The times are 12 ns, 32 ns, and 36 ns respectively.

FIG. 6 shows the timing when master 301 is doing I/O of its own at the time that slave 303 activates $\overline{\text{BUS REQ}}$ 503. As can be seen from that figure, master 301 waits until it is done with the I/O operation for which it is currently performing memory operations before it activates $\overline{\text{BUSACK}}$ 505. The bus cycles for the I/O operations appear in FIG. 6 as BUS CYCLE 1 and BUS CYCLE 2. The period indicated by 20 is the time required for $\overline{\text{BUSACK}}$ 505 to reach either an active or an inactive state; in a preferred embodiment, the maximum time is 32 ns.

FIG. 7 shows the timing from the point of view of slave 303. After slave 303 activates $\overline{\text{BUSREQ}}$ 503, master 301 responds by activating $\overline{\text{BUSACK}}$ 505, and thereupon slave 303 begins doing I/O operations. If master 301 inactivates $\overline{\text{BUSACK}}$ 505 while slave 303 is doing I/O operations, slave 303 ceases doing I/O operations and inactivates $\overline{\text{BUSREQ}}$ 503 for one clock cycle, permitting master 301 access to bus 103. The period indicated by 1 is the time required for $\overline{\text{BUSREQ}}$ 503 to reach either an active or inactive state, and that indicated by 2 is the set up time required by slave 301 before it can recognize the activation of $\overline{\text{BUSACK}}$ 505 by master 303. In preferred embodiment 201, the maximum time for period 1 is 30 ns and that for period 2 is 10 ns.

Figure 8:
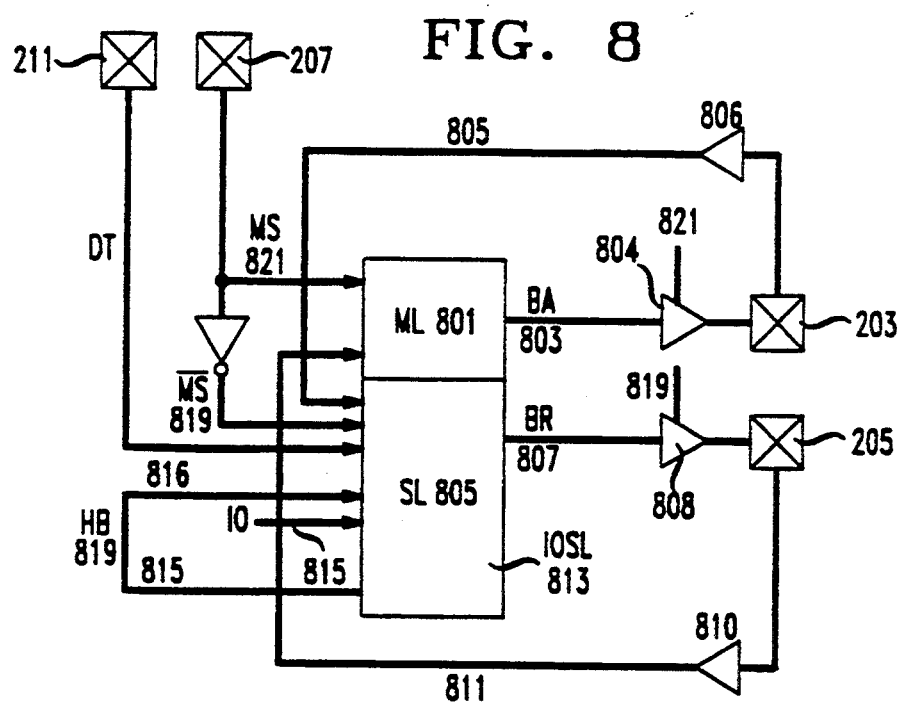
FIG. 8 is a logic diagram of the implementation of the $\overline{\text{BUSREQ}}$ and $\overline{\text{BUSACK}}$ pins in a preferred embodiment.

Master-Slave Logic: FIG. 8

FIG. 8 is an overview of the logic implementing the I/O state machine just explained. I/O state logic (IOSL) 813 receives inputs from $\overline{\text{DTACK}}$ pin 211 and M/S pin 207 and receives inputs from and provides outputs to $\overline{\text{BUSACK}}$ pin 203 and $\overline{\text{BUSREQ}}$ pin 205. Additionally, I/O state logic 813 receives IO input 815, indicating that microprocessor 107 has one or more I/O operations to perform, and provides HB signal 819, indicating whether microprocessor 107 presently has the bus, to itself. Within I/O state logic 813, master logic 801 provides HB signal 819 in response to MS signal 821 until it receives BR input 811 from pin 205, whereupon it responds by providing BA signal 803 to pin 203 and ceasing to provide HB signal 819. Slave logic 805 provides BR signal 803 to pin 205 in response to $\overline{\text{MS}}$ input 819, I/O input 815 or NIO input 817, indicating that there is I/O to do, and responds to BA signal 805 from pin 203 by providing HB signal 819.

As further shown in FIG. 8, the line BA 803 carries the bus acknowledge signal to be output to pin 203; driver 804 which outputs the signal to pin 203 is turned on and off by MS signal 821, thus, when that signal indicates that microprocessor 107 is a bus master, driver 804 is turned on; otherwise it is turned off. Bus acknowledge signals received on $\overline{\text{BUSACK}}$ pin 203 are provided to line 805 by driver 806, which is always on. Implementation 805 of $\overline{\text{BUSREQ}}$ pin 205 is similar, except that output of BR line 807 is controlled by driver 808, which is turned on only when the $\overline{\text{MS}}$ signal indicates that microprocessor 107 is a bus slave.

Figure 9:
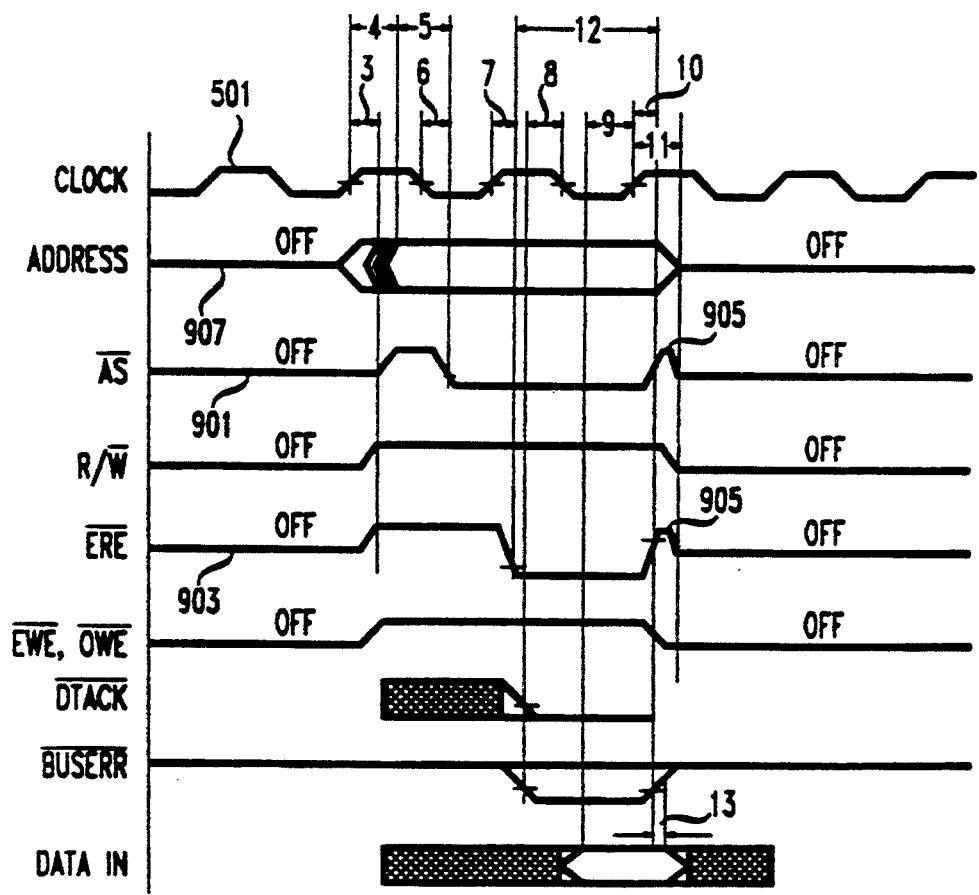
FIG. 9 is a byte or word read timing diagram showing how the $\overline{\text{AS}}$ and $\overline{\text{ERE}}$ and $\overline{\text{ORE}}$ lines go high before they are turned off.
Figure 10:
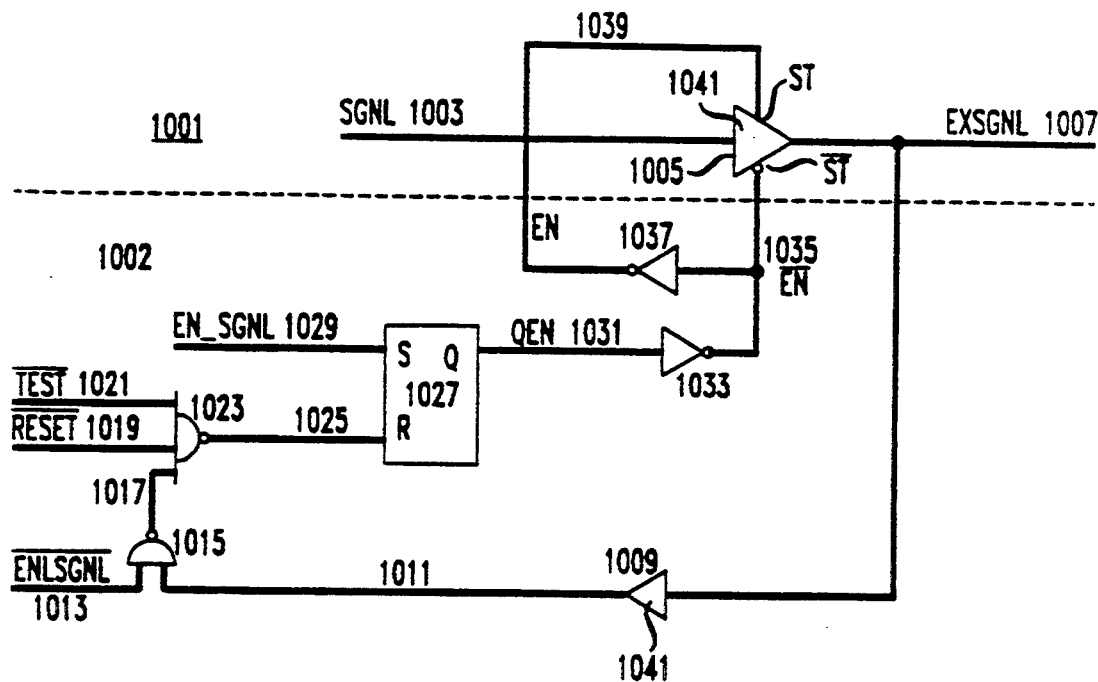
FIG. 10 is a logic diagram of the implementation of forcing certain lines high before they are turned off.

Bus Signals with Controlled Final States: FIGS. 9 and 10

Like many modern circuits, preferred embodiment 201 of microprocessor 107 employs three-state drivers to drive lines of bus 103. A three-state driver can put an output line in one of three states: logic active, logic inactive, or off. The logic active and inactive states are expressed by different voltage or current levels, depending on the kind of circuitry; the off state is expressed by a high impedance, i.e., from the point of view of other devices attached to the bus, the driver is no longer attached to the bus.

A difficulty with three-state drivers is that the state of the line when the three-state driver is turned off is the last state which the driver placed on the line prior to turning off. Thus, if the driver places the line in the active state and then turns off, the line remains in the active state for awhile, even though it is no longer being driven. The difficulty with this situation is that another device on the bus which responds to the line cannot distinguish between an active state being placed on the line by the driver and one remaining on the line after the driver has been shut off and may respond to an active state remaining on the line after the driver has been shut off in the same way that it responds to one being placed on the line by the driver. To prevent this problem, the an has typically brought a line driven by a three-state driver to an inactive state ½ clock cycle before turning the three-state driver off. The difficulty with this solution is of course the fact that an extra ½ cycle is required to turn a three-state driver off.

Preferred embodiment 201 of microprocessor 107 includes circuitry which solves the above problem by using feedback from the driver's output line to ensure that the driver has placed the line in an inactive state before turning the line off. FIG. 9 shows the effect of such circuitry on two signals 901 and 903 of preferred embodiment 201. The figure is a timing diagram for a byte read operation. In the operation, preferred embodiment 201 of microprocessor 107 performs a read of a byte of data from memory 102 across bus 103. Bus lines involved include address fines 311, data lines 313, and control lines carrying the CLOCK signal, the $\overline{\text{AS}}$ signal, the R/$\overline{\text{W}}$ signal, the $\overline{\text{ERE}}$ signal, the DTACK signal, and the $\overline{\text{BUSERR}}$ signal. The significance of these signals was explained in the discussion of FIG. 2 above. Two signals, $\overline{\text{AS}}$ and $\overline{\text{ERE}}$, are of particular interest here. $\overline{\text{AS}}$ is provided by microprocessor 107 to memory 102 to indicate that the address on address lines 311 is valid; $\overline{\text{ERE}}$ is provided by microprocessor 107 to memory 102 to indicate that the even byte of the word specified by the address on address lines 311 is to be read. Both signals are active low.

During the read operation, the signals behave as follows: Both $\overline{\text{AS}}$ and $\overline{\text{ERE}}$ remain off until the cycle of CLOCK 501 in which there is a valid address on address lines 907. At that point, microprocessor 107 places both $\overline{\text{AS}}$ and $\overline{\text{ERE}}$ in the inactive state. When CLOCK 501 goes low, $\overline{\text{AS}}$ goes to the active state, and when CLOCK 501 next goes high, $\overline{\text{ERE}}$ goes to the active state. Both remain active until memory 102 has placed the data on bus 103. When CLOCK 501 goes high after the data has been placed on bus 103, both $\overline{\text{AS}}$ and $\overline{\text{ERE}}$ are placed in the inactive state. As may be seen at reference number 905, the two pins are then immediately turned off. The effect of the invention is to guarantee that the rise to the inactive state shown at reference number 905 will occur regardless of the length of time between the point at which the pins are placed in the inactive state and the point at which they are turned off, and thereby to guarantee that memory 102 will not mistakenly respond to active $\overline{\text{AS}}$ and $\overline{\text{ERE}}$ signals remaining on bus 103 after a microprocessor 107 has ceased driving the signals.

FIG. 10 shows circuit 1001 used in preferred embodiment 201 of microprocessor 107 to produce the rise to the inactive state shown at reference number 905. Circuit 1001 is a modification of a standard bidirectional buffer circuit 1041, formed by driver 1005 for driving a signal received from the internal logic of microprocessor 107 onto a pin thereof and driver 1009 for driving a signal received on the pin into the internal logic of microprocessor 107. The main inputs to circuit 1001 are line 1003 carrying SGNL, a signal such as $\overline{AS}$ or $\overline{ERE}$, and line 1029 carrying EN_SGNL, a signal which enables the output of SGNL to a pin of preferred embodiment 201. The output from circuit 100 is line 1007 carrying EX_SGNL to the pin. Output of SGNL to line 1007 is controlled by driver 1005. Driver 1005 is a three-state driver and is turned on and off by signals input at points ST and $\overline{ST}$. When the input to ST is high and that to $\overline{ST}$ is low, driver 1005 is on; when the reverse is true, driver 1005 is off. The signals input to ST and $\overline{ST}$ are provided by circuitry 1002 consisting of driver 1009 connected to line 1007 and having line 1011 as its output, NAND gates 1015 and 1023, flip-flop 1027, and inverters 1033 and 1037. $\overline{EN\_SGNL}$ is the inversion of EN_SGNL; thus, when EN_SGNL is inactive, indicating that driver 1005 is to be turned off, $\overline{EN\_SGNL}$ is active. When that is the case, circuitry 1002 operates to ensure that EXSGNL is in its inactive state (in this case, high) before driver 1005 is turned off.

Operation of circuitry 1002 is as follows: When microprocessor 107 is initialized, $\overline{RESET}$ goes low, which results in a high output at line 1025. That in turn sets the Q output of flip-flop 1027 to a known state, namely 0. In that state, QEN 1031 is low, $\overline{EN}$ 1035 is high, EN 1039 is low, and driver 1005 is off. When microprocessor 107 turns driver 1005 on, it activates EN_SGNL, which is received on line 1029 at the S input of flip-flop 1027. The active EN_SGNL sets flip-flop 1027 to 1 and thus, the Q output of flip-flop 1027 goes high, QEN on line 103 1 is high, $\overline{EN}$ on line 1035 is low, EN on line 1039 is high, and driver 1005 is turned on. At the same time, $\overline{EN\_SGNL}$ goes low at the input to NAND gate 1015, which means that the output of that gate at line 1017 is high regardless of the state of line 1011. Line 1017 is one input to NAND gate 1023; the other inputs, $\overline{TEST}$ 1021 and $\overline{RESET}$ 1019 are high during normal operation of the circuitry; consequently, the output of NAND gate 1023 to line 1025 is low; that line is connected to the R input of flip-flop 1027, flip-flop 1027 is therefore not reset as long as EN_SGNL is high, and driver 1005 remains on.

When EN_SGNL goes low, the Q output of flip-flop 127 remains high until the signal received at the R input of flip-flop 127 goes high. That happens only after SGNL has gone high and driver 1005 has responded thereto by driving EN_SGNL 1007 high on line 1007. As indicated above, as long as $\overline{EN\_SGNL}$ is low, the state of EXSGNL has no effect on the state of the R input to flip-flop 1027; when $\overline{EN\_SGNL}$ goes high, the state of EXSGNL determines the state of the R input; thus, if EXSGNL is low, the output of NAND gate 1015 remains high and the output of gate 1023 to the R input of flip-flop 1027 remains low; if, on the other hand, EXSGNL is high, the output of NAND gate 1015 goes low, the output of NAND gate 1023 goes high, flip-flop 1027 is reset so that the Q output and QEN go low, $\overline{EN}$ goes high, and EN goes low, turning off driver 1005. The circuit thus guarantees that EXSGNL will go high before driver 1005 turns off.

As will be apparent to one skilled in the art, many variations on circuit 1001 are possible. For example, a variation may be constructed which requires that EXSGNL go low before driver 1005 is turned off; another variation may be built in which a low-high-low pulse derived from EN_SGNL drives SGNL high, so that EXSGNL is high before driver 1005 is turned off regardless of the prior state of SGNL.

Figure 11B:
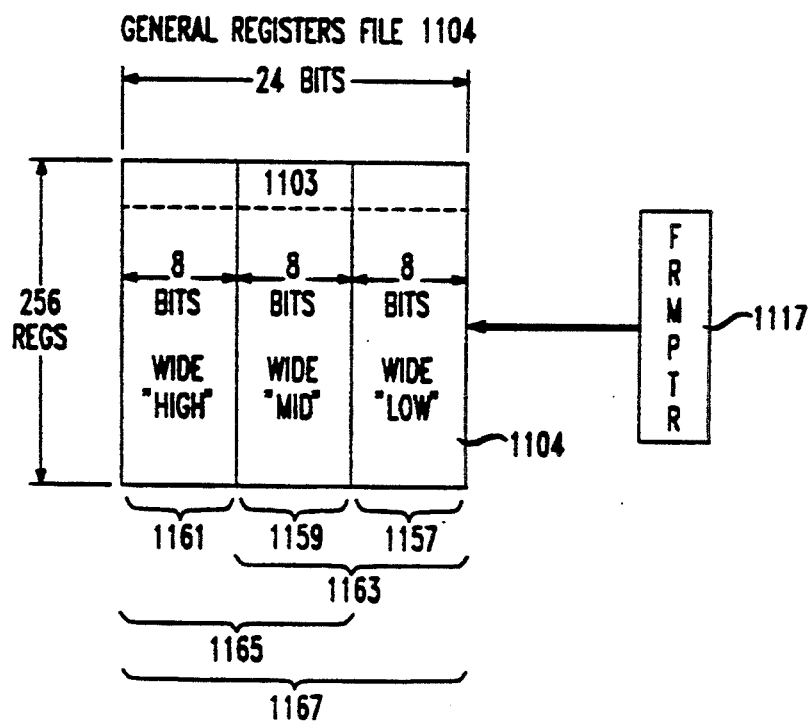
FIG. 11B is a block diagram showing addressing of general registers in the microprocessor.

The Instruction Architecture of Microprocessor 107: FIG. 11

The innovations in microprocessor 107 described thus far have concerned the interface between microprocessor 107 and a system 101 in which the microprocessor 107 is employed; other innovations concern certain instructions executed by microprocessor 107. The following discussion will first provide an overview of the instruction architecture of microprocessor 107 and then discuss those instructions which are of particular interest in detail.

FIG. 11 shows instruction architecture 1101 of microprocessor 107, i.e., the figure shows microprocessor 107 as it appears to a programmer who is writing code consisting of instructions from microprocessor 107's instruction set. Each of the registers and other components of instruction architecture 1101 represents a logical device whose behavior may be specified in instructions of the instruction set. The description begins with the registers.

REGISTERS

There are 256 general registers 1103 (0 to 255) and 14 special purpose registers in instruction architecture 1101.

GENERAL REGISTERS 1103

Figure 11A:
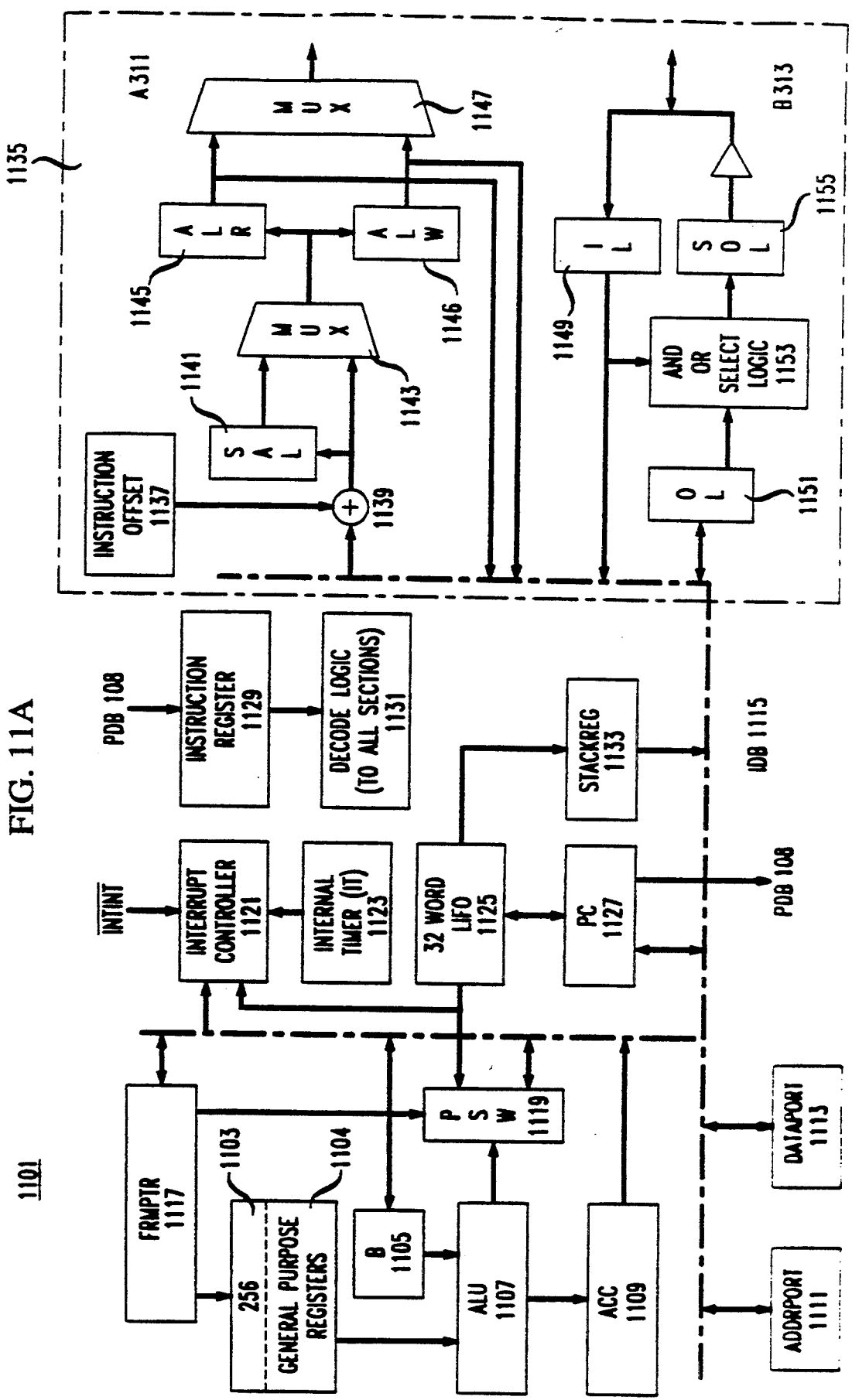
FIG. 11A is a block diagram showing the instruction architecture of a preferred embodiment of the microprocessor.

The 256 general registers 1103 make up general register file 1104. General registers 1103 are employed generally to store data being processed within microprocessor 107. Each general register is 24 bits wide, but the registers may be subdivided for addressing purposes. Addressing of general registers 1103 is shown in FIG. 11A. Each general register may be specified directly by an address between 0 and 255 or may be specified by means of an offset from the value contained in frame pointer (FRMPTR) register 1117. Within the addressed register, the following subdivisions may be specified:

low byte 1157: bits 0–7 of the addressed register;
middle byte 1159: bits 8–15 of the addressed register;
high byte 1161: bits 16–23 of the addressed register;
low word 1163: bits 0–15 of the addressed register;
high word 1165: bits 08–23 of the addressed register, and
entire register 1167: bits 0–23 of the addressed register.

With reference to internal dam bus (IDB) 1115, the general registers can be either a source (read operation) or a destination (write operation). When a general register 1103 is a source, the specified portion of the general register is output to the least significant bits of internal data bus 1115; the remaining bits of bus 1115 are set to 0; when a general register 1103 is a destination, the number of bits of internal data bus 1115 required for the portion are written to the portion, beginning with the least significant bit of internal data bus 1115. As may be seen from the foregoing, it is possible to write any byte or word from one general register 1103 to any byte or word of another general register 1103 without disturbing the remaining portions of either the source or destination general registers 1103.

Continuing with the special purpose registers, most of these registers are 24 bits wide. Generally, all of the special registers can be either source or destination for most instructions. One exception is accumulator (ACC) 1109—it cannot be a direct destination for many register moves.

PSW 1119

PSW 1119 is the Processor Status Word register. The format of PSW is as follows:

| Bit # | 11 | 10 | 9 | 8 | 7 | 6 | 5 | 4 | 3 | 2 | 1 | 0 |
|---|---|---|---|---|---|---|---|---|---|---|---|---|
| | SWB | T | I | X | A | B | F | L | ET | EX | Z | C |

The meaning of the bits is given in the following table:

| Mnemonic | Full Name | Explanation |
|---|---|---|
| C | Carry | Carry flag from ALU operations. |
| Z | Zero | Zero flag from ALU operations. |
| EX | Enable eXternal | Enables external interrupts. |
| ET | Enable Timer | Enables internal timer interrupts. |
| L | LIFO interrupt | Set when the internal LIFO overflows/underflows. |
| F | FRMPTR interrupt | Set when FRMPTR add/sub overflows/underflows. |
| B | Bus Error exception | Set when the $\overline{\text{BUSERR}}$ pin is asserted. |
| A | Address Error exception | Set when an odd address is used for word or long I/O. |
| X | External Interrupt | Set when an external interrupt is recognized. |
| I | Illegal instruction | Set when an illegal instruction is decoded. |
| T | Timer interrupt | Set when the internal timer interrupts. |
| SWB | Byte swap bit | Set to reverse the effect of I/M |

At reset, all bits in PSW 1119 are cleared to zero. Thus, the Carry and Zero flags are cleared and the external interrupts and timer interrupts are not enabled.

PSW 1119 may be read or written just like the other special-purpose registers, with a write often being used to change one of the interrupt enable flags or the SWB bit. However, for bits 4–10, the interrupt status flag bits, a move instruction can only clear these bits—they cannot be set by a move instruction. In other words, writing zeros will clear the interrupt status bits, and writing ones will leave the interrupt status bits unchanged.

Therefore, to clear a particular interrupt status bit, the interrupt status bits which it is desired to NOT clear should be set to a 1 in the word which will be written to PSW 1119 to modify it. The interrupt status bit which is desired to be cleared should have a 0 in the corresponding bit position of the word written to PSW 1119.

ACC 1109

ACC 1109 is a 24 bit register. It stores the result of operations by ALU 1107. In the case of 8 or 16 bit ALU operations, all 24 bits of ACC 1109 are affected, but only the 8 or 16 least significant bits will have valid information. With reference to internal data bus 1115, ACC 1109 is a source only, but an instruction exists to allow loading ACC 1109 from a general register 1103 by having ALU 1107 execute no operation on its input data. Also, ACC 1109 may be loaded from B register 1105, again by having ALU 1107 perform no operation on its input value.

B Register 1105

B register 1105 is a 24 bit register. It provides one of the operands to ALU 1107 for ALU operation instructions.

ALR 1145

ALR 1145 is a 24 bit address latch. It is used to hold the effective address for read operations of system memory 102.

ALW 1146

ALW 1146 is a 24 bit address latch. It is used to hold the effective address for write operations to system memory 102.

IL 1149

IL 1149 is a 24 bit register used to hold the input data from an external system memory read operation. The instruction set defines an 8 bit read, a 16 bit read and a 24 bit read which actually does two system reads to consecutive address locations in system memory 102.

OL 1151

OL 1151 is a 24 bit register used to hold the output data for an external system memory write operation. The instruction set defines an 8 bit write, a 16 bit write and a 24 bit write which actually does two system writes to consecutive address locations.

FRMPTR 1117

FRMPTR 1117 is an 8 bit register. General registers 1103 may be addressed by offsets ranging from +127 to −127 from the value stored in FRMPTR 1117. FRMPTR 1117 may be read and written from internal data bus 1115, and consequently, may be saved and set to a new value when a subroutine is entered and restored to its old value on return from the subroutine. This in turn makes it possible to use general registers 1103 as a stack of local variables used by a subroutine.

PC 1127

PC 1127 is a 16 bit program counter. It is used to control the program flow through access to the instructions stored in both internal ROM and/or private memory 108. On each clock cycle, the output of the PC is temporarily stored in a 16 bit latch. From that latch, it can be stored in the last-in-first-out (LIFO) stack 1125. This stack is used to implement subroutine returns and interrupt returns. Input to PC 1127 is from LIFO 1125 and internal data bus 1115. Output is to LIFO 1125, IDB 1115, and private data bus 108.

Note: When performing a move from PC instruction, since it is only 16 bits wide, the 6 bits (21–16) above the PC bits will contain the current value of the internal stack pointer, which is really a count of the number of addresses on the internal stack. These bits are provided so that during a post-mortem analysis of a program with a fatal error, it is possible to tell how many addresses to pop off of LIFO 1125 for examination. A move to PC will only affect the 16 bits of the PC.

IT 1123

IT 1123 is the 24 bit internal timer register. It contains the value used to initialize and reload the down-counter when it has reached zero and possibly generated an interrupt.

STACKREG 1133

STACKREG 1133 is a 16 bit register used to store the output from LIFO 1125 when a "popstack" instruction is executed. The popstack instruction and STACK-REG 1133 are intended to be used only for the interrupt handler for catastrophic exceptions—i.e. to handle FRMPTR or LIFO overflow/underflow exceptions, or Bus Error or Address Error exceptions. STACKREG 1133 allows the contents of LIFO 1125 to be examined during a post-mortem analysis to determine why the catastrophic failure occurred.

Instructions in Microprocessor 107

Certain aspects of the instructions executed by microprocessor 107 are of particular interest. Discussion of these aspects will begin with a description of instruction execution generally in microprocessor 107 and will then deal with the aspects as they appear in certain of the instructions.

Figures 19, 20:
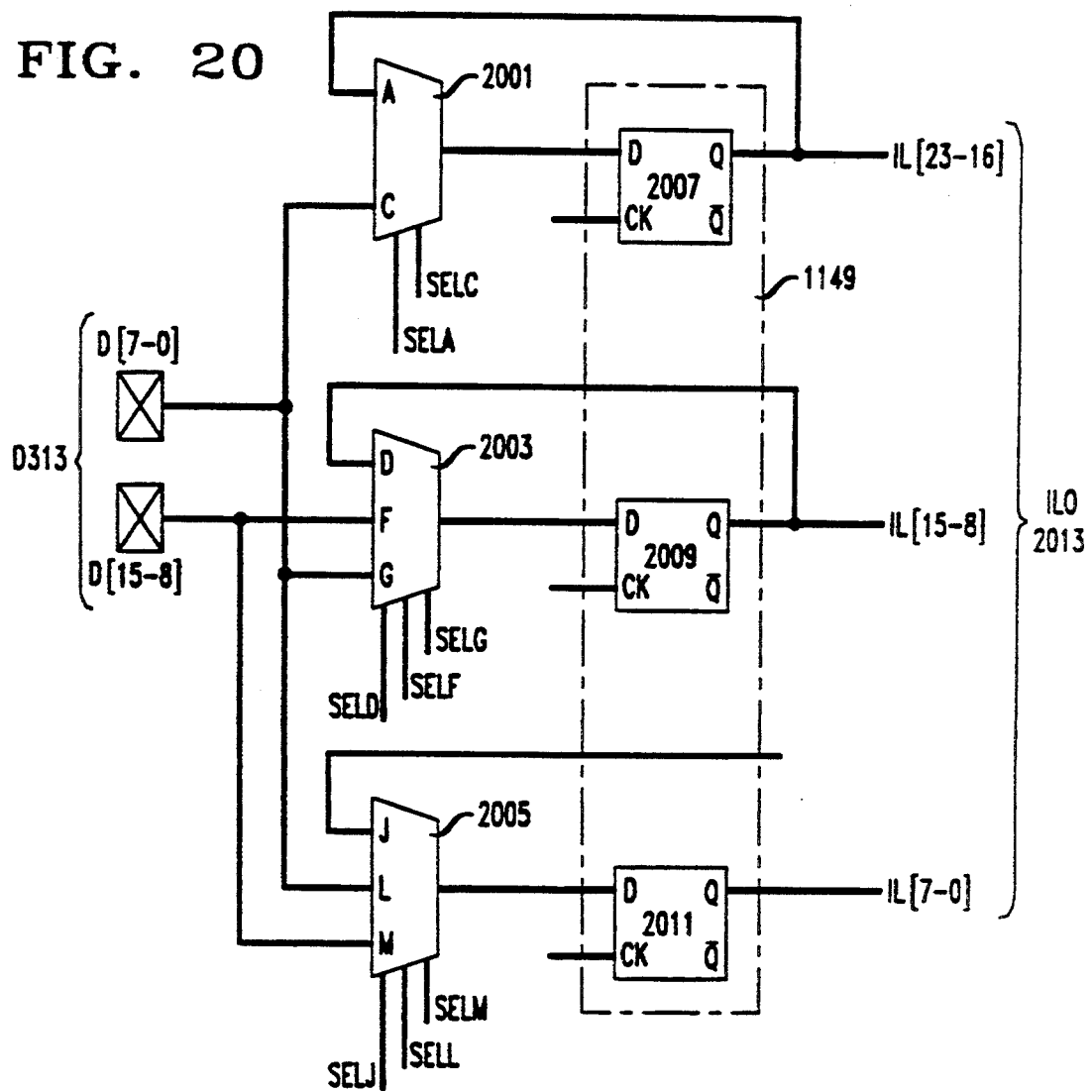
FIG. 19 is a diagram showing operation of the instruction and I/O pipelines in a preferred embodiment.
FIG. 20 is a logic diagram showing an implementation of input latch 1149 in a preferred embodiment.

Instruction Execution in Microprocessor 107: FIG. 19

One technique which is widely used to speed up instruction execution in processors is pipelining. The execution of any instruction has a number of phases. For example, with a MOVE instruction which moves data from one register to another, it is typically necessary to fetch the MOVE instruction, to decode it to determine that it is a MOVE instruction and to determine which register is the source of the data being moved and which the destination, and to actually execute the instruction by moving the data from the source register to the destination register. When instruction execution is pipelined, the phases of execution are performed in parallel on different instructions. For instance, if a pipelined processor is executing three instructions in the order n1, n2, and n3, it may be simultaneously performing the execution phase on n1, the decode phase on n2, and the fetch phase on n3.

Microprocessor 107 has two pipelines. The first pipeline is the instruction pipeline. The execution of every instruction is divided into three phases, fetch, decode, and execute, and these phases are performed in parallel. Consequently, microprocessor 107 is generally able to execute one instruction per cycle of CLOCK signal 501. The second pipeline is an I/O instruction pipeline, which handles the later phases of execution of I/O instructions independently of the instruction pipeline.

FIG. 19 shows the operation of the two pipelines. The operation of each pipeline is shown in the form of a table, with rows corresponding to the phases of instruction execution and columns corresponding to cycles of CLOCK 501. Table 1901 represents the instruction pipeline and table 1909 represents the I/O pipeline. As already mentioned, there are three phases of execution in instruction pipeline 1901: fetch (F) phase 1903, decode (De) phase 1905, and execute (E) phase 1907. There are two phases in I/O pipeline 1909: a load phase (L) 1911, in which the address required for the operation is loaded into a register in the I/O subsystem of microprocessor 107, indicated in FIG. 11 by box 1135, and an execute I/O phase (EIO) 1913 in which the address and the data are transferred via bus 103. EIO phase 1913 lasts until the transfer of data is complete, i.e. until the $\overline{\text{DTACK}}$ signal is received from memory 102. At a minimum, EIO phase 1913 lasts two clock cycles for byte and word reads and writes and four clock cycles for byte and word read-modifies-writes and pointer reads and writes. Additional cycles are required if microprocessor 107 must wait for access to bus 103 or if memory 102 cannot immediately respond.

FIG. 19 shows the execution of a sequence of four instructions, SysW1, a system write instruction which writes data to memory 102 from input latch 1149, SysW2, a second such instruction which writes data from output latch 1151, NIO1, which may be any instruction which is not an I/O instruction, and NIO2, a second such instruction. In cycle n, instruction pipeline 1901 executes F phase 1903 of SysW1; in cycle n+1, it executes F phase 1903 of SysW2 and De phase 1905 of SysW1; in cycle n+2, it executes F phase 1903 of NIO1, De phase 1905 of SysW2, and E phase 1907 of NIO1, and so forth.

I/O pipeline 1909 receives SysW1 in cycle n+2, and performs load phase L 1911 on it in the same cycle. In cycle n+3, I/O pipeline 1909 performs phase L on SysW2 and EIO phase 1913 on SysW1. That phase lasts two cycles for SysW1, or until cycle n+4. Consequently, SysW2 cannot enter EIO phase 1913 until cycle n+5; EIO phase 1913 lasts more than three cycles for SysW2, and SysW2 is still in that phase in cycle n+7, the last cycle shown in FIG. 19.

Since I/O pipeline 1909 operates independently of instruction pipeline 1901, execution of instructions in instruction pipeline 1901 need not wait until EIO phase 1913 is completed for SysW1 or SysW2. While the I/O is going on, instruction pipeline 1901 executes NIO1 and NIO2. Of course, it may at times be necessary to stop instruction pipeline 1901 to wait for I/O pipeline 1909. One such situation would occur if there were already an I/O instruction in L phase 1911 when a following I/O instruction entered E phase 1907; another such situation would occur if an NIO instruction required data in its E phase 1907 which was being provided by an I/O instruction which was still being executed by I/O pipe 1909.

Instruction Formats: FIG. 12

FIG. 12 shows the MOVE instructions executed by microprocessor 107. As may be seen from that figure, microprocessor 107's instructions are made up of 24-bit instruction words 1201. Most of the instructions consist of a single instruction word 1201; however, some MOVE instructions and LOAD instructions for 24-bit literal constants require two words. Except when instruction pipeline 1901 is halted, microprocessor 107 fetches one instruction word 1201 per clock cycle.

MOVE Instructions: FIGS. 12 and 12A

The MOVE instructions move data between registers of microprocessor 107. The register from which the data is moved is the source and the register to which it is moved is the destination. There are four types of move instructions:

Type 0, in which both the source and the destination are general registers 1103;

Type 1, in which a general register 1103 is the source and one of the special registers is the destination;

Type 2, in which one of the special registers is the source and one of the general registers 1103 is the destination; and Type 3, in which a special register is the source and another special register is the destination.

Type 0 instructions are shown in the portion of FIG. 12 labeled 1225. The instructions have two words, instruction word 1 (IW1) 1215 and instruction word 2 (IW2) 1217. Beginning with IW1 1215, the most significant 4 bits contain an operation code (OPCODE) 1203; the next 4 bits are a don't care field 1205; the following 4 bits, TYPE 1207, specify the type of move instruction. In type 0, TYPE 1207 has the value 0000; SIZE field 1209 indicates what portion of the contents of the source general register 1103 is to be moved to the destination general register 1103. The codes and the portion of general register 1103 which they specify are the following:

| SIZE code | Register Portion |
|---|---|
| 001 | low byte 1157 |
| 010 | middle byte 1159 |
| 100 | high byte 1161 |
| 011 | low word 1163 |
| 110 | high word 1165 |
| 111 | entire register 1167 |

The reference numbers refer to FIG. 11A.

The remaining 9 bits specify the general register 1103 which is the source. F bit 1211 indicates whether the general register 1103 is being specified by means of an offset from frame pointer 1117; if it is, general register source field 1213 contains the offset; if it is not, general register source field 1213 contains the number of general register 1103. The 12 most significant bits of instruction word 2 1217 are don't care bits 1219; bits 9–11 are SIZE field 1209; the code in SIZE 1209 in instruction word 2 1217 specifies the portion of the destination general register 1103 which will receive the dam. If the portion specified by SIZE in instruction word 2 1217 is larger than that specified by SIZE in instruction word 1 1215, the most significant bits are 0 filled; if the portion is smaller, the excess most significant bits are discarded. The remaining 9 bits contain F field 1211 and general register destination field 1221, which together specify destination general register 1103 in the same fashion as the corresponding fields specify the source general register in instruction word 1 1215.

Execution of type 0 move instruction 1225 is shown in pipeline diagram 1223. In cycle n, IW1 1215 is fetched; in cycle n+1, IW2 1217 is fetched and IW1 1215 is decoded; the decoding involves computing which general register 1103 is the source register and reading the portion thereof specified by SIZE field 1209 into a latch connected to internal data bus 1115. In cycle n+2, IW2 1217 is deemed to determine which general register 1103 is the destination register, and in the same cycle, the contents of the latch are read into the portion of the destination general register 1103 specified by size field 1209.

Move instructions of types 1 and 2 are shown in the portion of FIG. 12 labeled 1233. The type 1 instruction has a general register 1103 as its source and a special register as its destination; the type 2 instruction has a special register as its source and a general register 1103 as its destination. Except for the value of type field 1207, the format of the two types is the same. The most significant 4 bits are opcode 1203; the next four bits, SPR 1227, are a code specifying one of the special registers; then comes SIZE field 1209, and finally F field 1211 and GR field 1229 specifying a general register 1103. Whether the special and general registers are source and destination or vice-versa depends on the value of TYPE field 1207. The effect of SIZE is the following:

If a general register 1103 is the source and the portion specified by SIZE 1209 is less than 24 bits, the specified portion is placed on the least significant bits of IDB 1115 and the remaining bits are set to 0.

If a general register 1103 is the destination and the portion specified by SIZE 1209 is less than 24 bits, the specified portion is written from the least significant bits of IDB 1115.

Execution of a type 1 or 2 MOVE instruction in instruction pipeline 1901 is shown in diagram 1231. At cycle n, the instruction is fetched; at cycle n+1, the source and destination are determined; at cycle n+2, the data is written via IDB 1115 from the source to the destination.

The type 3 move instruction moves data from a source special register to a destination special register. The instruction is shown at reference number 1241 in FIG. 12A. The instruction has an opcode 1203 in bits 20–23, a code in bits 16–19 specifying the destination special register, TYPE 1207 in bits 12–15, and a code in bits 0–3 specifying the source special register. Bits 4–11 are "don't care" bits. As implied by the absence of SIZE field 1209, the instruction always moves 24 bits. Execution in the pipeline is substantially the same as for the type 1 and 2 instructions.

Figure 16:
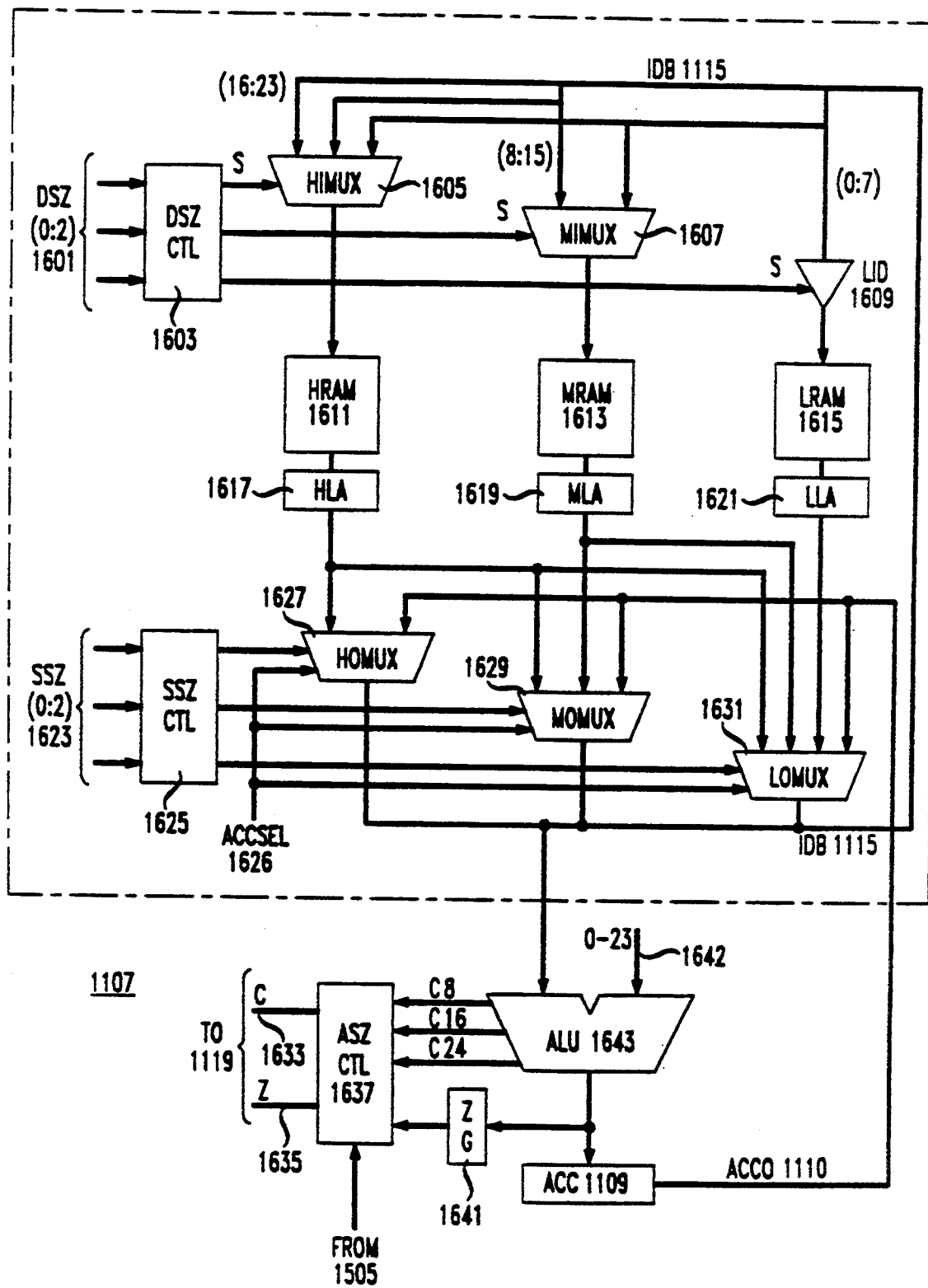
FIG. 16 is a logic diagram showing the implementation in a preferred embodiment of register size and ALU size.

Implementation of SIZE: FIG. 16

FIG. 16 is a logic diagram showing details of general registers 1103, ALU 1107, and ACC 1109 in preferred embodiment 201 of microprocessor 107. As described above, SIZE field 1209 permits the programmer of microprocessor 107 to specify any byte or contiguous 16-bit word contained in a general register 1103 or all 24 bits of the general register 1103 as a source or destination of data for a MOVE operation. When fewer than 24 bits are specified as a source, the specified data is placed in the least significant bits of internal data bus 1115 and the remaining more significant bits of internal data bus 1115 axe zero filled. When fewer than 24 bits are specified as a destination, the contents of that many bits of internal data bus 1115 are moved to the destination. Thus, if a type 0 MOVE instruction specified a move from the middle byte of general register 5 to the high byte of general register 10, the middle byte of general register 5 would be output to the eight least significant bits of internal data bus 1115 and the remainder of internal data bus 1115 would be filled with zeros. The eight least significant bits of internal data bus 1115 would then be input to the high byte of general register 10. The move would leave the low and middle bytes of general register 10 undisturbed.

The logic which performs this function is shown in portion 1104 of FIG. 16. At the center of that portion are three 8×256 RAMs, low RAM CLRAM) 1615, middle RAM (MRAM) 1613, and high RAM (HRAM) 1611, which contain the 256 general registers 1103. As expected from their names, low RAM 1615 contains the least significant byte for each general register 1103, middle RAM 1613 contains the next most significant byte, and high RAM 1611 contains the most significant byte.

Data is received in these RAMs from internal dam bus 1115 by means of a driver, low input driver (LB) 1609, and two input multiplexers, middle input multiplexer (MIMUX) 1607, and high input multiplexer (HIMUX) 1605. Output from LID 1609 goes to LRAM 1615, output from MIMUX 1607 to MRAM 1613, and output from HIMUX 1605 to HRAM 1611. HIMUX selects its input from bits 0:7, 8:15, or 16:23 of internal data bus 1115, MIMUX 1607 selects its input from bits 0:7 or 8:15, and LID 1609 has bits 0:7 as its only input. Selection of inputs for output by the two multiplexers and LID 1609 is by means of selection signals originating in destination size control (DSZ CTL) 1603, which in turn has as its input three destination size lines (DSZ) 1601 carrying the value of SIZE field 1209 in the second word of a type 0 MOVE instruction or in a type 2 MOVE instruction, i.e., those instructions in which a general register 1103 may be specified as a destination for data. Depending on the value of SIZE field 1209, DSZCTL 1603 selects the low byte of internal data bus 1115 for input to any of the three RAMs 1611, 1613, and 1615, the low word of internal data bus 1115 for input to RAMs 1611 and 1613 or 1613 and 1615, or the entire 24 bits of internal data bus 1115 for input to all three RAMs.

Data output from the three RAMs 1611, 1613, and 1615 goes first to three latches corresponding to the three RAMs, high latch (HLA) 1617, middle latch (MLA) 1619, and low latch (LLA) 1621. This arrangement permits general registers 1103 to be both sources and destinations in type 0 MOVE instructions. Output from the three latches 1617, 1619, and 1621 is to internal data bus 1115 via three multiplexers, high output multiplexer (HOMUX) 1627, middle output multiplexer (MOMUX) 1629, and low output multiplexer (LOMUX) 1631. Each of the three multiplexers receives inputs from the latches and from accumulator register 1109. The latter set of inputs permits ACC 1109 to be a source of data for operations by ALU 1643 or a source of data for a MOVE. Other multiplexers which are not shown in FIG. 16 permit ACC 1109 to be a destination of data for a MOVE. HOMUX 1627 receives input only from HLA 1617 and ACCO [23-16] and outputs to internal data bus 1115 [23-16]; MOMUX 1629 receives input from ACCO [15-8] and from either MLA 1619 or HLA 1617 and outputs to internal data bus 1115 115-8];LOMUX 1631, finally, receives inputs from ACCO [7-0] and from HLA 1617, MLA 1619, or LLA 1621 and outputs to of internal data bus 1115 [7-0]. With any of the three multiplexers 1627, 1629, and 1631, if no inputs are selected, the multiplexer outputs all "0's" to its byte of internal data bus 1115. Selection of input from latches 1617, 1619, and 1621 by the three multiplexers is governed by signals provided by source size control (SSZ CTL) 1625. These signals are in turn determined by the value of source size (SSZ) 1623, which in turn is derived from the value of SIZE field 1209 in the first word of the type 0 MOVE instruction or SIZE field 1209 in the type 2 MOVE instruction, i.e., wherever a general register 1103 is a source for a MOVE. Thus, when SIZE specifies either the low, middle, or high byte of the source general register 1103, that byte is selected by LOMUX 1631 from the one of latches 1617, 1619, and 1621 which contains the byte and output to the least significant 8 bits of internal data bus 1115, while the remaining two muxes 1627 and 1629 output 0's to the 16 most significant bits of internal data bus 1115. When SIZE specifies either the low or high word from the source general register, the word is selected by LOMUX 1631 and MOMUX 1629 from either latches 1617 and 1619 or latches 1619 and 1621 for output to the 16 least significant bits of internal data bus 1115, and HOMUX 1627 outputs 0's to the remaining 8 most significant bits of internal data bus 1115. When SIZE specifies all 24 bits of general register 1103, finally, HOMUX 1627 selects the contents of HLA 1617 for output to the 8 most significant bits of internal data bus 1115, MOMUX 1629 selects the contents of MLA 1619 for output to the next most significant bits, and LOMUX 1631 selects the contents of LLA 1621 for the 8 least significant bits of internal data bus 1115.

MOVE with Input Latch 1149 as the Source: FIG. 14

One of the special registers which may function as a source of data in a special register to general register 1103 MOVE instruction or a special register to special register MOVE instruction is input latch 1149. When microprocessor 107 performs a READ I/O operation, the data received from memory 102 in the read operation is loaded into input latch 1149. As indicated above, the time required to complete an I/O operation often cannot be determined until it is done. A corollary of this fact is that the time when data resulting from a given READ operation will be present in input latch 1149 also cannot be determined until the data is them.

The corollary in turn has important consequences for the operation of instruction pipeline 1901. Instruction pipelines 1901 are generally intended to be invisible to programmers, i.e., the result of execution of instructions by the pipeline is exactly the same as if the execution of each instruction was completed before the execution of the following instruction was begun. As long as each instruction syllable requires the same number of cycles to execute as all the others, there is in fact no distinction between sequential execution of instructions and execution of instructions in a pipeline. However, that is not the case when there are instructions such as the I/O instructions of microprocessor 107. A program writing a sequence of instructions which includes a READ instruction followed by a MOVE instruction which has input latch 1149 as a source will naturally assume that when the MOVE instruction is executed, the data in input latch 1149 will be the data which was read from memory 102 by the READ instruction. The problem is that the MOVE instruction is always executed in three phases of one cycle each, while the READ instruction is executed in five phases which take a minimum of 5 cycles and may require an indefinite number of cycles. Consequently, even though a MOVE instruction follows a READ instruction in pipeline 1901, the MOVE instruction may complete all phases of its execution before the data read by the READ instruction is in latch 1149.

To prevent such an occurrence, microprocessor 107 keeps track of whether the last I/O instruction executed by microprocessor 107 has completed its EIO phase 1913. If it has not, microprocessor 107 halts instruction pipeline 1901 when it decodes the first MOVE instruction following the I/O instruction. Pipeline 1901 remains halted until the I/O instruction has completed EIO phase 1913. If the I/O instruction was a READ instruction, the data read from memory 102 by the instruction will at that point be in input latch 1149 and the MOVE instruction may safely enter the execute phase. Such halting of a pipeline to await the conclusion of execution of an instruction is termed a pipeline exception or stall in the art. Dealing with pipeline stalls is an important problem in the design of pipelined processors.

The portion of FIG. 14 labeled 1401 shows the effect of this arrangement on pipeline 1901 when a sequence of READ and MOVE from IL instructions are being executed. As in FIG. 19, the rows represent the phases of instruction pipeline 1901, while the columns represent clock cycles. The figure presumes that EIO phase 1913 of I/O pipeline 1909 lasts no more than two cycles for each READ instruction. In cycle n, the first system read instruction, SysR1, enters fetch phase 1903; in cycle n+1, the first move from the input latch instruction, MIL1, enters fetch phase 1903 and SysR1 enters decode phase 1905; in cycle n+2, the next system read instruction, SysR2, enters fetch phase 1903, MIL1 enters decode phase 1905, and SysR1 enters execute phase 1907. Since SysR1 has not finished its EIO phase 1913 by the end of cycle n+2, microprocessor 107 stops pipeline 1901 at cycle n+3, as indicated by the label W 1405 in the column for that cycle. I/O pipeline 1909 continues, and SysR1's EIO phase 1913 lasts through cycle n+4. That being the case, instruction pipeline 1901 remains stopped in cycle n+4 as well. At the end of that cycle, the data is available for MIL1, which performs the move in cycle n+5. In cycle n+6, SysR2 is in execute phase 1907, MIL2 is in decode phase 1905, and the next read instruction, SysR3 is in fetch phase 1903. Since SysR2 has again not finished its EIO phase 1913, pipeline 1901 again stops at cycle n+7. It remains stopped through cycle n+8, and MIL1 will enter its execute phase and perform the move at cycle n+9 (not shown). As can be seen from this description, even though I/O pipeline 1909 allows a system read operation to be performed every two cycles, the maximum rate at which reads combined with moves from input latch 1149 can be performed is once every 4 cycles.

The foregoing shows how stalls of instruction pipeline 1901 can drastically slow execution of a sequence of instructions. In order to increase the speed of reads followed by moves from input latch 1149, microprocessor 107 has a special form of the MOVE instruction which permits the programmer to move data from input latch 1149 before the last I/O instruction preceding the MOVE has finished its EIO phase 1913. The special form is called "move instruction latch no wait" (MILNW), and is specified by means of a special code in SPR field 1227 of the type 2 MOVE instruction or SPS field 1239 of the type 3 MOVE instruction. When MILNW is specified as the source register by means of the special code, a MOVE instruction will move new data from input latch 1142 as soon as the new data arrives. In a preferred embodiment, new data is identified by keeping track of whether the data in input latch 1149 has been moved from the latch; if it has not been, the data is new and will be moved by MOVE with MILNW. Using MILNW, it is possible to perform a READ combined with a move from input latch 1149 once every two cycles. Of course, the protection provided by the MOVE instruction without MILNW is lacking, and it is up to the programmer using MILNW to ensure that the SysR instructions and the MILNW instructions are in the proper sequence.

Portion 1403 of FIG. 14 shows how MILNW works. As before, the first Read instruction, SysR1, enters fetch phase 103 in cycle n. The programmer writing the code knows that the phases of SysR1 will require at least 5 cycles; consequently, he does not follow SysR1 with the MOVE instruction, but instead with the next READ instruction, SysR2. Thus, in cycle n+1, SysR1 is in decode phase 1905 while SysR2 is in fetch phase 1903. The MOVE instruction, in the special form MILNW, comes in cycle n+2. In that cycle, SysR1 is in execute phase 1907 of instruction pipe 1901 and load phase 1911 of I/O pipe 1909 and SysR2 is in decode phase 1905. The instruction following MILNW1 in cycle n+3 is another READ instruction, SysR3. MILNW1 is in decode phase 1905, SysR2 is in execute phase 1907 of instruction pipe 1901, and SysR1 is in the first cycle of EIO phase 1913 of I/O pipe 1909. Since the data being read by SysR1 will be back in the second cycle of EIO phase 1913, i.e., in cycle n+4 at the earliest, input latch 1149 presently has no data and MILNW1 cannot enter execute phase 1907; consequently, microprocessor 107 stops instruction pipe 1901 for the cycle n+4. EIO phase 1913 for SysR1 is complete at the end of cycle n+4, so microprocessor 107 restarts instruction pipe 1901 in cycle n+5. The data from SysR1 is now available in input latch 1149 and MILNW1 moves it to the specified destination in cycle n+5. In that cycle also, SysR2, which has been waiting in load phase 1911 of I/O pipe 1909 for EIO phase 1913 for SysR1 to finish, enters EIO phase 1913. Further, SysR3 is in decode phase 1905, and the next MILNW instruction, MILNW2, is in fetch phase 1903. As may be seen from the remainder of portion 1403, from this point forward, a read and a move from input latch 1149 may be performed every two cycles instead of every four cycles, as is the case with the regular MOVE instruction.

Effectively, the MOVE instruction with MILNW as the source permits the programmer of microprocessor 107 to take advantage of his knowledge of three facts:
that the phases of an I/O instruction requires a minimum of five cycles;
that I/O pipeline 1909 operates independently of instruction pipeline 1901; and
that the I/O pipeline permits a second I/O instruction to enter execution phase
1907 of instruction pipeline 1901 before the first I/O instruction has finished execution.

Because the above is the case, execution of SysR1 and SysR2 can overlap in both instruction pipeline 1901 and I/O pipeline 1909 and the move from input latch 1149 of the data placed there by SysR1 can be performed while SysR2 is waiting for the data to be returned from Memory 102. MOVE with ILNW consequently permits a series of reads from memory 102 to registers 1103 in which each read requires only two cycles. Conceptually, MOVE wi MOVE with MILNW provides the programmer with an instruction which behaves exactly the same way as the usual move from input latch 1149, except that MOVE with MILNW does not have the side effect of halting instruction pipeline 1901 as soon as the MOVE enters decode phase 1905.

ALU Instructions with ALUSIZE: FIGS. 15 and 16

ALU instructions specify operations performed by ALU 1107 on operands from four sources:
a general register 1103;
B register 1105;
Accumulator register 1109; and
eight-bit literal values contained in the ALU instructions.

The operations include addition, subtraction, left and fight shift, and logical operations including AND, OR, and NOT. A special feature of these operations is the ability to specify in the instruction that CARRY and ZERO condition bits in program status word 1119 not be affected by an ALU operation or be set according to the effect the operation has on the least significant 8 bits of the result, the least significant 16 bits, or the entire 24-bit result.

FIG. 15 shows ALU instruction 1501 for microprocessor 107. Beginning with the most significant bits, bits 20–23 are opcode 1503 for the instruction, ALU size bits 19–17 (AS 1505) specify whether the status bits are to be set at all, and if they are, whether they are to be set from the least significant 8 bits, the least significant 16 bits, or from the entire result. ALU operation bits 12–16 (AOP 1507) specify the operation to be performed by ALU 1107; SI77E field 1209 specifies which bytes of a general register 1103 are to serve as a source for an ALU operation; in some operations, bits 0–7 specify an 8-bit immediate value 1509; if they do not, bits 0–8 specify a general register 1103 as described for the MOVE instruction, with bit 8 indicating whether bits 0–7 represent the address of a general register 1103 directly or an offset from the address in frame pointer register 1117.

Implementation of ALlYSIZE in a preferred embodiment is shown in portion 1107 of FIG. 16. As previously indicated, muxes 1627, 1629, and 1631 provide inputs from general registers 1103 and ACCO 1110 to ALU 1643; input 1641 of ALU 1643 receives data from B register 1105 or from IMM field 1509 of the ALU instructions. Besides outputting the result of the ALU operation to ACC 1109, ALU 1643 also outputs an 8-bit carry signal C8, a 16-bit carry signal C16, and a 24-bit carry signal C24. Each signal is active if there is a carry out of the 8, 16, or 24 least significant bits respectively as a result of the ALU operation. Additionally, zero generator (ZG) 1641 receives all 24 bits of the result and generates a code indicating whether the least significant 8 bits were all 0, whether the least significant 16 bits were all 0, or whether all 24 bits were 0. The code and the three carry signals go to ALU Size Control (ASZCTL) 1637, which further takes as an input a value derived from ALU Size field 1505 of the ALU instruction. The output of ASZCTL 1637 are signals C 1633 and Z 1635 which set the Carry and Zero bits in program status word 1119. Depending on the code in ALU Size field 1505, ASZCTL 1637 may not set the Carry and Zero bits, may set them in accordance with the state of the least significant byte, may set them in accordance with the state of the least significant two bytes, or may set them in accordance with the state of the entire bit result.

The combination of general registers in which individual bytes and words are addressable and an ALU in which zero and carry may be determined for a byte of a result, a word of a result, and the entire 24-bit result makes microprocessor 107 into a powerful and flexible data processing machine. For example, 16 or 24-bit bit sequences may easily be read from memory 102 and then processed inside microprocessor 107 as sequences of two or 3 bytes. It is also easy to deal with a sequence of bits as both a single data item and as a structured data item.

System Memory I/O in Microprocessor 107: FIGS. 2 and 9

Another area in which microprocessor 107 is particularly adapted for efficient and flexible use in a variety of systems is system memory I/O. In system memory I/O, data is read from and written to memory 102 via system bus 103. In preferred embodiment 201 of microprocessor 107, microprocessor 107 is connected to system bus 103 by 16 data lines and 23 address lines. Each address specifies a 16-bit word in memory 102. The system I/O operations performed by microprocessor 107 include reads and writes for bytes, 16-bit words, and 24-bit pointers and read-modify-writes for bytes and words. In the byte reads, the signals $\overline{ERE}$ and $\overline{ORE}$ (see FIG. 2) specify whether the even or odd byte of the word specified by the address is being read. In the byte writes, the corresponding signals are $\overline{EWE}$ and $\overline{OWE}$.

FIG. 9 shows the timing of a system memory byte read: Once microprocessor 107 has gained access to bus 103, the byte read requires a minimum of two cycles of clock 501 on bus 103: one to place the address, the address strobe signal $\overline{AS}$ and either $\overline{ERE}$ or $\overline{ORE}$ on the bus and one to receive the data from bus 103. The timing is substantially the same as shown above for the byte write and the word read and write. The 24-bit pointer read and write operations require 4 cycles: two as described above for two bytes of the pointer and two more for the third byte. The read-modify-write instructions require a minimum of four cycles: two for the read and two for the write. More time may be required for any of the I/O operations if memory 102 is unable to respond immediately. For this reason, memory 102 provides the $\overline{DTACK}$ signal to microprocessor 107 when it has provided the data in a read operation or received the data in a write operation. Microprocessor 107 waits for the $\overline{DTACK}$ signal before it concludes the second cycle of a read or write operation.

I/O Subsection 1135: FIG. 11

The instruction architecture for microprocessor 107's system I/O instructions is shown in I/O subsection 1135 of FIG. 11. Registers in Section 1135 are accessible by means of internal data bus 1115. Programmer-specifiable registers include ALR 1145, which is loaded with a 24-bit address on a read operation, ALW 1146, which is loaded with an address on a write operation, input latch 1149, which receives data from system bus 103 on a read operation, and output latch 1151, which receives data to be written to system bus 103 on a write operation. Both input latch 1149 and output latch 1151 are 24-bit registers; byte I/O operations read or write the 8 least significant bits, word operations the 16 least significant bits, and pointer operations the entire register.

Section 1135 further includes registers which are part of I/O pipeline 1909. Shadow address latch (SAL) 1141 holds the address for an I/O instruction which has entered load phase 1911 before the preceding I/O instruction has left EIO phase 1913. Shadow output latch (SOL) 1155 holds the data to be output by a write instruction which is in EIO phase 1913 when a following I/O instruction enters load phase 1911, thus making OL 1151 available to be loaded before the write operation is complete. Operation of I/O pipeline 1909 is as follows: if the pipeline is empty when an I/O instruction enters load phase 1911, ALR 1145 is loaded if the I/O instruction is a read instruction. If it is a write instruction, OL 1151 has been loaded by a previous MOVE instruction and load phase 1911 loads ALW 1146. On the first cycle of EIO phase 1913 for the write instruction, the contents of OL 1151 are moved to SOL 1155, freeing OL 1151 to be loaded by a MOVE instruction in that same cycle or later. On the first cycle of EIO phase 1913 after microprocessor 107 has gained access to bus 103, the data in SOL 1155 and the address in ALW 1146 are output to bus 103 until memory 102 responds with the $\overline{DTACK}$ signal. If there is already an I/O instruction in pipeline 1909 when the next I./O instruction enters load phase 1911, the address is loaded into SAL 1141. Finally, if SAL 1141 is full when an I/O instruction whose execute phase 1907 would load that register reaches decode phase 1905, instruction pipeline 1901 is halted until the register becomes available.

In preferred embodiment 201, address and data processing typical of I/O operations is performed in I/O subsection 1135, so that ALU 1107 may concurrently perform other operations. One example of such processing is offset adder 1139. When an address is loaded into ALR 1145 or ALW 1146, an offset 1137 which is specified in the I/O instruction may be added to the address; moreover, the instruction may specify either ALR 1145 or ALW 1146 as the source of the address for an I/O operation and use offset adder 1139 to add the offset to the current contents of the specified register. As may be seen from FIG. 11, this is implemented by means of buses connecting the outputs of ALR 1145 and ALW 1146 to internal data bus 1115, which in turn provides the address input to offset adder 1139.

Another example of such processing is the provision of both ALR 1145 and ALW 1146 and the provision of a connection between the output of input latch 1149 and the input of shadow output latch 1155. These features taken together permit efficient movement of data from one location in memory 102 to another location in memory 102. Since both the read and write addresses are available in ALR 1145 and ALW 1146 and input latch 1149 is available as a source of data for the write operation, the write operation may immediately follow the read operation and the transfer of a word or byte from one location to another in memory 102 requires a minimum of four cycles. Finally, AND/OR select logic is provided between IL 1149 and OL 1151 on the one hand and SOL 1155 on the other. This permits the contents of OL 1151 (loaded by a previous MOVE instruction) to be ANDed or ORed with the contents of IL 1149, and thus permits reading of data from memory 102, modifying it by means of a mask in OL 1151, and writing the data back to memory 102 in a minimum of four cycles.

I/O Instructions: FIGS. 13, 17, and 18

Microprocessor 107 has three I/O instructions: a READ instruction, a WRITE instruction, and a READ-MODIFY-WRITE instruction. The formats of all three instructions are shown in FIG. 13. The READ instruction is identified by reference number 1301, the WRITE instruction by reference number 1313, and the READ-MODIFY-WRITE instruction by reference number 1319. As is apparent in that FIG., all of the I/O instructions have a number of features in common. Beginning with the most significant bits, bits 20–23 are the opcode, which is different for each of the three instructions; bits 12–19 are an 8-bit OFFSET value which is added to the value of a pointer to obtain the address used in the I/O operation. I/O Size (IOS) field 1307 (bits 11 and 10) indicates the size of the data to be read or written and, in conjunction with I/M pin 209, the format of 16-bit words and 24-bit pointers. Bits 0 through 8 make up pointer (PTR) field 1311, which specifies a register of microprocessor 107 which contains a value to be used as a pointer, i.e., a value representing a location in memory 102, in the I/O operation. The specified register may either be a general register 1103 or one of the special registers, most generally ALR 1145 or ALW 1146. In the case of a general register 1103, the register is either specified directly by means of its number in GR field 1229 or indirectly by means of an offset from the value in frame pointer 1117. As with the MOVE instructions, F bit 1211 indicates which mode is being used. In the case of a special register, SR field 1312 contains a code for the special register, while bits 4–8 are a don't care field, here DC 1310.

As is clear from the common fields described above, microprocessor 107 executes I/O instructions generally as follows: in decode phase 1905, the pointer indicated by pointer fields 1311 is made the source for internal data bus 1115; in execute phase 1907, the pointer value passes via internal data bus 1115 to either of ALR 1145 or ALW 1146, depending on the kind of I/O instruction. As the pointer is being moved, the offset in bits 12–19 is added to it by offset adder 1139. Execute phase 1907 is thus simultaneously load phase 1911 for instruction pipeline 1909. EIO phase 1913 of instruction pipeline 1901 begins in the cycle following the loading of the pointer into ALR 1145 or ALW 1146. If instruction pipeline 1901 already has an I/O instruction in it, the pointer is loaded into SAL 1141 instead of ALR 1145 or ALW 1146.

WRITE instruction 1313 additionally has latch source (LS) field 1317. One setting of the single-bit field indicates that the source of the data to be written is output latch 1151; the other setting indicates that it is input latch 1149. The utility of this arrangement for performing back-to-back memory reads and writes has already been described.

READ-MODIFY-WRITE instruction 1319 also has an additional one-bit field: AND/OR field 1323. One setting of the bit indicates that logic 1153 is to AND the contents of IL 1149 with those of OL 1151; the other indicates that logic 1153 is to OR the contents of the two registers. Again, the utility of this arrangement for performing read-modify-writes in four cycles has already been described. As previously indicated, READ-MODIFY-WRITE only writes bytes or words; consequently, IOS field 1307 in this instruction cannot specify a 24-bit data item.

Reads and Writes with Different Data Formats: FIGS. 11 and 17

As shown in FIG. 1, in many applications, microprocessor 107 will be cooperating with a host processor 105. In some applications, host processor 105 may be another microprocessor 107; however, in others, it will be a different processor or microprocessor. In particular, it is highly probable that host processor 105 will have either the Intel 80×86 architecture or the Motorola 680×0 architecture. Two of the ways in which these architectures differ are the format of their pointers and the manner in which bytes are stored in 16-bit words. Three features of microprocessor 107, I/M pin 209, a code in IOS field 1307 of the I/O instructions, and the SWB bit in program status word 1119, permit microprocessor 107 to be easily employed with either an 80×86 host or a 680×0 host. The code in IOS field 1307 further permits a programer to write a single program which will execute properly in both the 80×86 and 680×0 environments.

FIG. 17 shows the different ways the 80×86 architecture and the 680×0 architecture organize bytes in memory 102 and the different ways in which they format pointers. In the byte and word examples, the figure presumes that a sequence of 4 bytes with the values AA, BB, CC, and DD are being stored. When an 80×86 performs a sequence of byte write operations to a memory organized into 16-bit words and the sequence begins on a word boundary, the results are shown at 1701: the first byte AA is written to the 8 least significant bits of the first word, the next, BB, to the 8 most significant bits of the first word, the next, CC, to the 8 least significant bits of the second word, and the next, DD, to the 8 most significant bits of the second word. When a 680×0 performs the same operation, the results are shown at 1703: the first byte AA is written to the 8 most significant bits of the first word, the next byte BB is written to the 8 least significant bytes of that word, the third byte CC is written to the 8 most significant bytes of the second word, and the fourth byte DD is written to the 8 least significant bytes of the second word.

On the other hand, when the same four bytes are written by word write operations, with the first word write writing bytes AA and BB and the second word write writing the bytes CC and DD, there is no difference between the 80×86 and 680×0 organizations, as shown by 1705. In both cases, AA is in the 8 most significant bits of the first word to be written, BB is in the 8 least significant bits, CC is in the 8 most significant bits of the second word, and DD is in the 8 least significant bits of that word.

Continuing with the pointer formats, both architectures employ 32-bit pointers which are stored in two adjacent words. Processor 107 uses 24-bit addresses and is consequently only concerned with the 24 least significant bits of the 32-bit pointers. Presuming that the 24 least significant bits have the value AABBCC, with AA being the most significant byte and CC the least, the 80×86 format is that shown at 1707 and the 680×0 format is that shown at 1709. In the 80×86 format, the most significant byte of the pointer is in the 8 least significant bits of the second word, the next most significant byte is in the 8 most significant bits of the first word, and the least significant byte is in the least significant bits of the first word. In the 680×0 format, the most significant byte of the pointer is in the least significant 8 bits of the first word, the next most significant byte is in the most significant 8 bits of the second word, and the least significant 8 bits are in the least significant 8 bits of the second word.

Microprocessor 107 deals with some of the inconsistencies between the 80×86 and 680×0 architectures by means of I/$\overline{\text{M}}$ pin 209. When microprocessor 107 is operating with an 80×86 host 105, Vcc is input to pin 207; when microprocessor 107 is operating with a Motorola 680×0 host 105, pin 207 is grounded. Generally, pin 207 will be either tied to ground or Vcc, since the type of host processor 105 is not likely to change with any frequency. The input to the pin 207 could, however, be made switchable in order to permit system reconfiguration.

Beginning with the byte operations, these are specified in IOS field 1307 of the instruction by means of the code "00". In the byte write operation, the byte to be written is contained in the least significant 8 bits of SOL 1155; in both 80×86 and 680×0 modes, the byte is output to both bits 0-7 and 8-15 of data lines 313 of bus 103. The input at the I/$\overline{\text{M}}$ pin and the value of the least significant bit of the address then determine whether the $\overline{\text{EWE}}$ signal or the $\overline{\text{OWE}}$ signal is enabled to write the byte to the upper or lower byte of the addressed word, as required by the 80×86 and 80×0 memory formats.

In the byte read operations, the odd byte will be on lines data 8-15 and the even byte on data lines 0-7; in the second case, the reverse will be true. Which byte is read into bits 7-0 of input latch 1149 in response to a given odd or even byte address depends on the input which microprocessor 107 receives on I/$\overline{\text{M}}$ pin 209 and the SWB bit in PSW 1119. If SWB is set to 0 and the input to I/$\overline{\text{M}}$ is low, indicating a 680×0 host, a read of an even byte results in the byte on lines 8-15 being read into input latch 1149 [7-0], while a read of an odd byte results in the byte on lines 0-7 being read into that portion of input latch 1149. If SWB is set to 0 and the input to I/$\overline{\text{M}}$ is high, indicating an 80×86 host, the reverse of the above occurs. If SWB is set to 1, finally, microprocessor 107's response to the input to I/$\overline{\text{M}}$ pin 209 is the reverse of that just described. SWB thus gives the programer a way of overriding the effect of I/$\overline{\text{M}}$ on byte reads.

In the read-modify-write for byte data, the read works as just described and the write as just described for the byte write, except that the dam in SOL 1155 is the contents of input latch 1149 as ANDed or ORed with the mask in OL 1151.

Word operations are specified in I/O size field 1307 by the code 01. There is no difference between the 80×86 and 680×0 formats for 16-bit memory words, and consequently, I/$\overline{\text{M}}$ pin 209 does not affect the manner in which these operations are performed. In the write, the lower 16 bits of SOL 1155 are output to data lines 313; in the read, the bits on data lines 313 are latched into the lower 16 bits of input latch 1149. The same is the case for the read portion of the read-modify-write and the write portion of that operation.

A pointer read operation, indicated by the code 10 in I/O size field 1307, requires that two words be fetched from memory 102. If the host is a 680×0, the lower byte of the first word contains the most significant byte of the pointer, while the upper and lower bytes of the next word contain the next less significant byte and the least significant byte. Thus, when I/$\overline{\text{M}}$ pin 209 indicates that the host is a 680×0, the read of the first word from memory 102 causes the contents of data lines 313 [70] to be placed into input latch 1149 [23-16]. When the second word is read from memory 102, the contents of data lines 313 [15-8] go into input latch 1149 [15-8] and the contents of data lines 313 [7-0] go simultaneously into latch 1149 [7-0].

If the host is an 80×86, the first word contains the least significant byte of the pointer in its lower byte and the next least significant byte of the pointer in its upper byte; the second word contains the most significant byte of the pointer in its lower byte. Consequently, when I/$\overline{\text{M}}$ pin 209 indicates that the host is an 80×86, the read of the first word from memory 102 results in the contents of data lines 313 [158] being placed into input latch 1149 [15-8] and those of data lines 313 [7-0] being placed into input latch 1149 [7-0]. On the next cycle, the contents of data lines 313 [7-0] are placed in input latch 1149 [23-16].

When pointers are being written, if I/$\overline{\text{M}}$ pin 209 indicates that the host is a 680×0, the write of the first word to memory 102 results in shadow output latch 1155 [23-16] being placed on D 313 [7-0] and zeros being placed on z 313 [15-8], while the write of the second word results in shadow output latch 1155 [15-8] being placed on D 313 [15-8] and shadow output latch 1155 [7-0] being simultaneously placed on D 313 [7-0]. If I/$\overline{\text{M}}$ pin 209 indicates that the host is an 80×86, the write of the first word results in shadow output latch 1155 [15-8] being placed on D 313 [158] and shadow output latch 1155 [7-0] being simultaneously placed on D 313 [7-0]. The write of the second word results in shadow output latch 1155 [23-16] being placed on D 313 [7-0] and zeros being placed on D 313 [15-8].

The I/M̄ pin 209 by itself ensures that if host processor 105 does a byte, word, or pointer write of data to memory 102 and microprocessor 107 does a byte, word, or pointer read of the same data from memory 102 or vice-versa, both host processor 105 and microprocessor 107 will receive the data in the expected format. However, if host processor 105 does two byte writes to memory 102 and microprocessor 107 does a word read of the two bytes, the positions of the bytes in the word will depend on whether host processor 105 is an 80×86 or a 680×0, and the code in microprocessor 107 which processes the word will depend on the type of host processor. Since this is the case, a change in host processor would require extensive revision of the code, which in turn would greatly increase the cost of developing systems using microprocessor 107.

This problem is solved in microprocessor 107 by the code 11 in I/O size 1307. That code indicates "word with swapped byte" i.e., that word I/O operations are to be employed but that the bytes of the word are to be swapped if I/M̄ pin 209 indicates that the host is an 80×86 machine. Thus, if "word with swapped byte" is indicated in an I/O instruction, microprocessor 107 will be able to correctly perform word read and write operations on byte data regardless of whether the host is a 680×0 machine or an 80×86 machine, and there will be no need to write different code depending on the type of host machine.

The "word with swapped byte" code and I/M̄ pin 209 interact to produce the result described above as follows: In a read operation, when I/M̄ specifies a 680×0 host, the contents of D 313 [15-8] go to input latch 1149 [15-8] and those of D 313 [7-0] go to input latch 1149 [7-0]; when I/M̄ pin 209 specifies an 80×86 host, the contents old 313 [15-8] go to input latch 1149 [7-0] and those old 313 [7-0] go to input latch 1149 [15-8]. In a write operation, when I/M̄ pin 209 specifies a 680×0 host, the contents of shadow output latch 1155 [7-0] go to D 313 [7-0] and those of shadow output latch 1155 [15-8]go to D313 [15-8]. When I/M̄ pin 209 specifies an 80×86 host, the contents of shadow output latch 1155 [7-0] go to D 313 [15-8] and those of shadow output latch 1155 [8-15] go to D 313 [7-0]. In the read-modify-write with "word with swapped byte" the read and the write phases of the operation are as just described for the read operation and the write operation.

Implementation of Data Input and Output: FIGS. 18, 20, 21–23

FIGS. 18, 20, 21–23 show the implementation in preferred embodiment 201 of input latch 1149, output latch 1151, shadow output latch 1153, AND/OR 1323, and the control logic which controls those devices. Beginning with FIG. 20, that figure shows input latch 1149 and the multiplexers which permit the byte swapping operations just described. Input latch 1149 is made up of three 8-bit latches, latch 2007, containing the most significant byte, latch 2009, containing the next most significant byte, and latch 2011, containing the least significant byte. Output from the latches is to input latch output (ILO) 2013. Input to the latches comes from muxes 2001, 2003, and 2005. Each of these muxes takes input from data lines 313 and ILO 2013. Specifically, mux 2001 selects input for latch 2007 from data lines 313 [7-0] or input latch 1149 [23-16], mux 2003 selects input for latch 2009 from data lines 313 [15-8], data lines 313 [7-0], or input latch 1149 [15-8], and mux 2005 selects input for latch 2009 from data lines 313 [15-8], data lines 313 [7-0], or input latch 1149 [7-0]. If a mux 2001, 2003, or 2005 is not selected, it outputs 0's. Selection is performed by selection lines A, C, D, F, G, J, L, and M according to the table below. The notation source→destination in the table indicates that the data in the source is transferred to the destination when the selection line is active.

| Sel. line | Effect |
|---|---|
| A | IL 1149 [23-16] → IL [23-16] |
| C | D 313 [7-0] → IL [23-16] |
| D | IL [15-8] → IL [15-8] |
| F | D [15-8] → IL [15-8] |
| G | D [7-0] → IL [15-8] |
| J | IL [7-0] → IL [7-0] |
| L | D [7-0] → IL [7-0] |
| M | D [15-8] → IL [7-0] |

Figure 21:
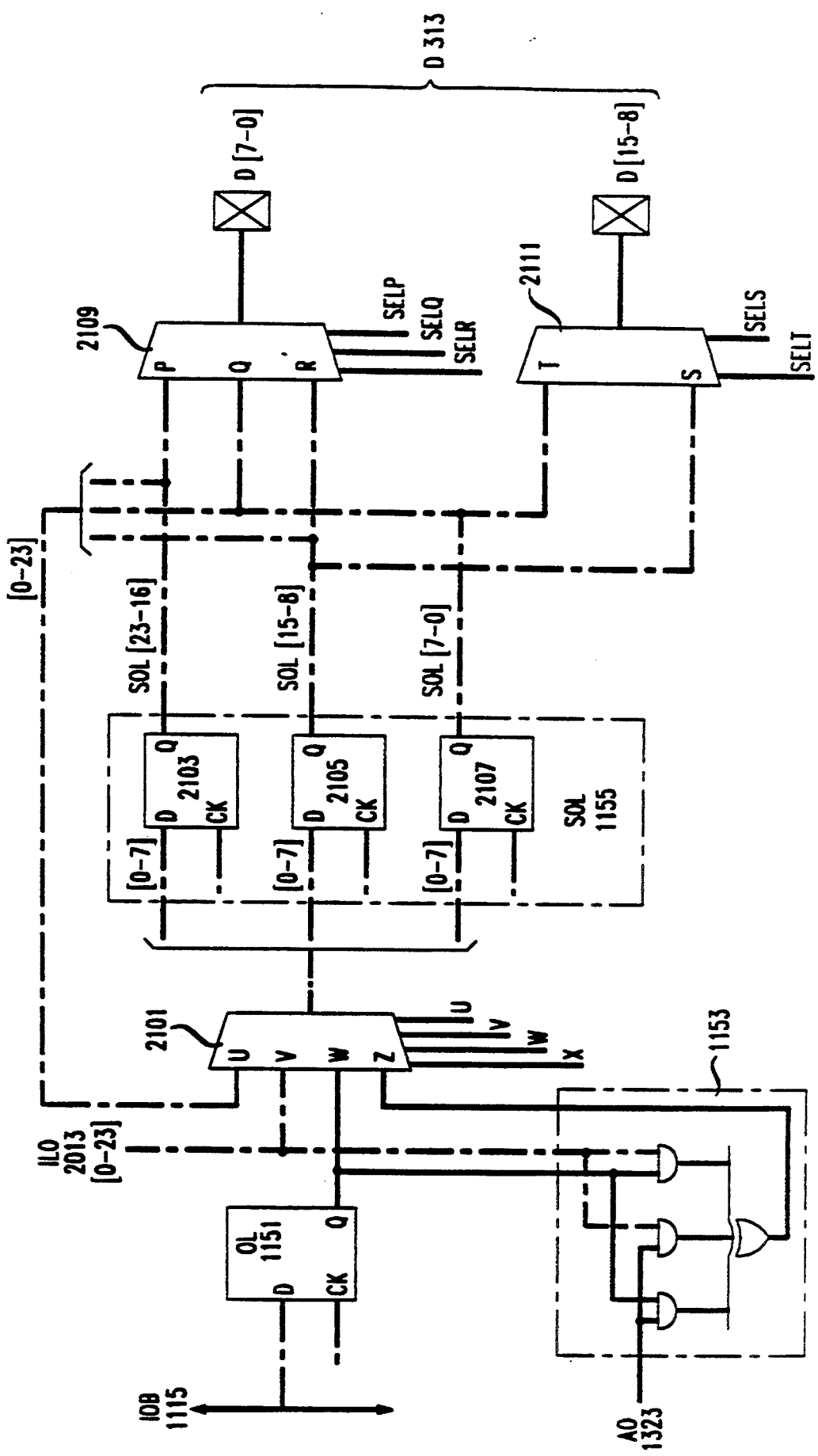
FIG. 21 is a logic diagram showing an implementation of output latch 1151 and shadow output latch 1155 in a preferred embodiment.

Continuing with FIG. 21, that figure shows the implementation of output latch 1151, AND/OR logic 1153, and shadow output latch 1155. Inputs for this circuitry come from internal data bus 1115, input latch 1149 via ILO 2013, and shadow output latch 1155. Output is to data lines 313. Selection of inputs is by multiplexer 2101, while selection of outputs is by multiplexers 2109 and 2111. If one of these multiplexers is not selected, it outputs 0's. Beginning with output latch 1151, that latch receives its inputs from internal data bus 1115 and provides outputs to AND/OR logic 1153 and to multiplexer 2101. Multiplexer 2101 additionally receives inputs from ILO 2013, which is connected to the output of input latch 1149, SOL 1155, and AND/OR logic 1153. Output from mux 2101 is to shadow output latch 1155, which has three 8-bit latches, latch 2103, containing bits [23-16], latch 2105, containing bits [15-8], and latch 2107, containing bits [7-0]. Outputs are via muxes 2109 and 2111 to D 313 [7-0] and [15-8]. Selection of inputs is by selection lines U,V,W, and X for mux 2101 and P,Q,R,S, and T for muxes 2109 and 2111. The table shows the line and the result of the selection.

| Sel. line | Effect |
|---|---|
| U | SOL 1155 → SOL 1155 |
| V | IL 1149 or ILO 2013 → SOL |
| W | OL 1151 → SOL |
| X | IL → A/O Logic 1153 → SOL |
| P | SOL [23-16] → D 313 [7-0] |
| Q | SOL [15-8] → D [7-0] |
| R | SOL [7-0] → D [7-0] |
| S | SOL [15-8] → D [15-8] |
| T | SOL [7-0] → D [15-8] |

The selection lines are controlled by selection logic 1801, shown in FIGS. 18, 22, and 23. The selection lines are the outputs of I/O control logic (I/OCTL) 1819; the inputs for the logic are the following:

| Signal | Meaning |
|---|---|
| RW | 1: Read operation; 0: write operation |
| RMW | 1: Read/modify/write operation |
| RMWW | 0: Read part of read-modify-write operation; 1: write part |

-continued

| Signal | Meaning |
| --- | --- |
| IOS | Codes from IOS 1307 |
| IL/OL | 0: write data from OL 1151;<br>1: write data from IL 1149 |
| LONG2 | Second part of pointer read or write |
| A0 | Least significant address bit;<br>0: even byte;<br>1: odd byte |
| ITL | 1: 80 × 86 mode unless SWB is set;<br>0: 680 × 0 mode unless SWB is set (see below) |

The RW, RMW, IOS, and IL/OL signals are all derived ultimately from the I/O instructions; A0 is derived from the contents of ALR 1145 or ALW 1146, depending on the I/O operation; LONG2 and RMWW are derived from internal control logic of microprocessor 107 which keeps track of the phase of execution of I/O instructions; ITL is produced by ITL logic 1803. When ITL has the value 1, I/O section 1135 operates as if microprocessor 107 was operating in a system with an 80×86 host; when ITL 1817 has the value 0, I/O section 1135 operates as if microprocessor 107 was operating with a 680×0 host. With operations other than byte I/O operations, the value of ITL 1817 is determined solely by the value microprocessor 107 is receiving on I/$\overline{M}$ pin 209; with the byte operations, the effect of the I/$\overline{M}$ pin 209 may be reversed by setting the SWB bit in program status word 1119 to 1.

This effect is produced by ITL logic 1803 as follows: ITL 1817 is the negated output of XOR gate 1815; the inputs to gate 1815 come from I/$\overline{M}$ pin 209 and NAND gate 1811, which has three inputs. Inputs $\overline{IOS0}$ 1805 and $\overline{IOS1}$ 1807 are the negations of IOS 1307; PSW_SWB 1809 is derived from the PSW status bit. When either $\overline{IOS0}$ 1805 or $\overline{IOS1}$ 1807 is low, indicating that IOS 1307 specifies something other than byte I/O, NAND gate 1811 has a 1 output at 1813 and negated output 1817 of XOR gate 1815 is the same as the input from I/$\overline{M}$ pin 209. When both inputs 1807 and 1805 are high, indicating the 00 code for byte I/O, the output of gate 1811 is determined by PSW_SWB 1809. When input 1809 is low, NAND gate 1811 still has a 1 output, and output 1817 is the same as input 209, as just described. When input 1809 is high, i.e., when the SWB bit is set in PSW 1809, NAND gate 1811 has an 0 output and output 1817 is the inverse of input 209, that is, the effect of I/$\overline{M}$ pin 209 is reversed.

Operation of I/OCTL 1819 is shown in the truth tables of FIGS. 22 and 23. FIG. 22 shows the truth table for READ and READ-MODIFY-WRITE operations. There are sections of the table for byte reads, word reads, word reads with the WSB code in IOS 1307, pointer reads, byte read-modify-writes, word read-modify-writes, and word read-modify-writes with the WSB code in IOS 1307. The columns in the center pan of the table indicate values for the input signals to I/OCTL 1819; the columns in the fight-hand part of the table indicate values resulting from the inputs on selector lines 1833. In the center portion of the table, "X's" indicate "don't care" bits, i.e., bits whose value makes no difference in the operation indicated by the row. In the fight-hand portion of the table, "." indicates a "don't care" bit. Taking the first row of the table as an example, the row shows that when RW=1, indicating a read operation, RMW=0, indicating that it's not a read-modify-write, IOS indicates a byte operation (i.e., has the code 00), ITL has the value 0, indicating 680×0 mode, and A0 has the value 0, indicating an even byte address, then select line M is high and the rest low. The values on the input lines indicate that the operation specified by the row is a read of an even byte from data that is stored in 680×0 format. Turning to FIG. 20, it may be seen that when select line M is active, mux 2005 selects D 313 [15-8] as the source for input latch 1149 [7-0]. Turning then to FIG. 17, it may be seen that the selected byte is indeed an even byte in 680×0 byte format 1703. When read as just indicated, the truth tables of FIGS. 22 and 23 and the logic diagrams of FIGS. 18, 20, and 21 show how the read and write operations just described are implemented in preferred embodiment 201.

Conclusion

The foregoing "Detailed Description" has shown how to make and use a processor which shares memory with other processors and in which the same code can be used even though the memory is shared with other processors having different data formats. In the embodiment disclosed in the "Detailed Description", the data formats concerned the ordering of bytes; however, the invention may be employed with data formats which differ in other ways. In the disclosed embodiment, the instructions whose operation is dependent on the data formats are I/O instructions; again, the principles of the invention may be employed with other types of instructions. Instructions which fall within the ambit of the invention may be specified by means other than the WSB code in the IOSIZE field employed in the disclosed embodiment, and the actual swapping may be achieved by circuitry other than the circuitry disclosed in the present application. For these reasons, the implementation disclosed in the "Detailed Description" is to be regarded in all respects as merely illustrative and exemplary and the invention claimed herein is not defined by the disclosed implementation, but instead by the claims as interpreted in light of the doctrine of equivalents.

What is claimed is:

1. In a processor able to share memory containing data with another processor and having instruction execution means for executing instructions, the improvement comprising:

data format signal receiving means for receiving a data format signal from a source external to the processor which provides the data format signal independently of the instructions currently being executed and the data currently being processed by the processor, the data format signal indicating a data format which is an order of pluralities of bytes in the memory employed by the other processor; and operation means in the instruction execution means, the operation means being responsive to data format dependency indicating means in certain ones of the instructions which indicate that the manner in which a read or write operation specified by the instruction is executed depends on the data format employed by the other processor and being also responsive to the data format signal to perform the operation specified by the instruction as required by the data format indicated by the data format signal.

2. The processor set forth in claim 1 wherein:
the number of bytes in the pluralities of bytes is two;

a first one of the other processors is able to place the two bytes in a first order in the memory;

a second one of the other processors is able to place the two bytes in a second order in the memory;

the data format signal indicates either the first order or the second order; and the read operation places any two bytes being read from the memory in the first order when the data format signal indicates the second order and the write operation places any two bytes being written to the memory in the second order when the data format signal indicates the second order.

3. The processor set forth in claim 2 wherein:

the first order is that employed by processors of the 680×0 type; and the second order is that employed by processors of the 80×86 type.

4. A data processing system comprising:

a memory for storing dam;

a first processor which is coupled to the memory and processes the data, the first processor belonging to one of a plurality of processor types, each processor type employing a different data format which defines an order of pluralities of bytes in the memory for certain items of the data; and a second processor which is coupled to the memory and processes the data, the second processor executing instructions which specify operations and which include at least one instruction which specifies a read or a write operation and has data format dependency indicating means which indicate that the manner in which the processor performs the operation specified by the instruction is dependent on the data format employed by the first processor for the certain items and the second processor including data format signal receiving means for receiving a data format signal from a source external to the second processor which provides the data format signal independently of the instructions currently being executed and the data currently being processed by the second processor, the data format signal indicating the data format employed by the first processor, and operation means responsive to the data format signal and the data format dependency indicating means for performing the operation specified by the instruction as required by the data format indicated by the data format signal.

5. The system set forth in claim 4 wherein:

the number of bytes in the pluralities of bytes is two;

a first one of the types of processors is able to place he two bytes in a first order in the memory;

a second one of the types of processors is able to place the two bytes in a second order in the memory;

the data format signal indicates either the first order or the second order; and the read operation places any two bytes read from the memory in the first order when the data format signal indicates the second order and the write operation places any two bytes written to the memory in the second order when the data format signal indicates the second order.

6. The system set forth in claim 5 wherein:

the first one of the types is the 680×0 type; and the second one of the types is the 80×86 type.

* * * * *

UNITED STATES PATENT AND TRADEMARK OFFICE
CERTIFICATE OF CORRECTION

PATENT NO. : 5,446,865
DATED : August 29, 1995
INVENTOR(S) : G. T. Corcoran, R. C. Fairfield, A. T. Sufi It is certified that error appears in the above-indentified patent and that said Letters Patent is hereby corrected as shown below:

IN THE CLAIMS:

Column 37, line 19: "storing dam;" should read --storing data;--

Column 38, line 18: "able to place he" should read --able to place the--

Signed and Sealed this

Thirteenth Day of February, 1996

*Attest:*

BRUCE LEHMAN

*Attesting Officer*       *Commissioner of Patents and Trademarks*